US011875245B1

(12) United States Patent
Rodriguez

(10) Patent No.: US 11,875,245 B1
(45) Date of Patent: Jan. 16, 2024

(54) SYSTEM, APPARATUS AND METHOD FOR SPIKING NEURAL NETWORK

(71) Applicant: Government of the United States, as represented by the Secretary of the Air Force, Rome, NY (US)

(72) Inventor: Dilia E. Rodriguez, Fayetteville, NY (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 1103 days.

(21) Appl. No.: 16/184,041

(22) Filed: Nov. 8, 2018

Related U.S. Application Data

(60) Provisional application No. 62/633,644, filed on Feb. 22, 2018.

(51) Int. Cl.
| | |
|---|---|
| *G06N 3/08* | (2023.01) |
| *G06N 3/049* | (2023.01) |
| *G06F 18/214* | (2023.01) |
| *G06N 3/045* | (2023.01) |

(52) U.S. Cl.
CPC .......... *G06N 3/049* (2013.01); *G06F 18/214* (2023.01); *G06N 3/045* (2023.01); *G06N 3/08* (2013.01)

(58) Field of Classification Search
CPC ........ G06N 3/049; G06N 3/0454; G06N 3/08; G06N 3/045; G06K 9/6256
See application file for complete search history.

(56) References Cited

U.S. PATENT DOCUMENTS

| | | | | |
|---|---|---|---|---|
| 10,824,940 | B1 * | 11/2020 | Rybakov | G06N 3/08 |
| 11,232,016 | B1 * | 1/2022 | Huynh | G06N 3/0454 |
| 2011/0119467 | A1 * | 5/2011 | Cadambi | G06N 20/10 |
| | | | | 712/27 |
| 2015/0171868 | A1 * | 6/2015 | Rodriguez | H03K 19/017581 |
| | | | | 326/38 |
| 2018/0174042 | A1 * | 6/2018 | Srinivasa | G06N 3/08 |
| 2019/0026078 | A1 * | 1/2019 | Bannon | G06N 3/063 |

(Continued)

OTHER PUBLICATIONS

Lin JH, Vitter JS. Complexity results on learning by neural nets. Machine Learning. May 1991;6(3):211-30. (Year: 1991).*

(Continued)

*Primary Examiner* — Oluwatosin O Alabi
(74) *Attorney, Agent, or Firm* — AFRL/RI; Randall P. Jones

(57) ABSTRACT

Systems and associated methods for constructing neural networks (NN) without the benefit of predefined output spike times or predefined network architecture. Functions are constructed from other functions determined from an input construction training set of output variable type. Method aspects of the neural network modeler may comprise partitioning the construction training set, representing the partitions, restricting the representations, constructing subfunctions from the restrictions, and combining the subfunctions to model the target function. Specifically, subfunctions represented from partition-specific neural networks of output value type are created using two fundamental composition operations: same-constant composition and different-constants composition. Different choices of weights and delays lead to different NNs with different output spikes that implement the same function.

20 Claims, 33 Drawing Sheets

(56) References Cited

U.S. PATENT DOCUMENTS

| | | | |
|---|---|---|---|
| 2019/0132591 A1* | 5/2019 | Zhang | H04N 19/59 |
| 2019/0205741 A1* | 7/2019 | Gupta | G06F 9/3853 |
| 2019/0294980 A1* | 9/2019 | Laukien | G06N 3/04 |
| 2020/0117993 A1* | 4/2020 | Martinez-Canales | G06N 3/084 |

OTHER PUBLICATIONS

Aydogan D. CNNEDGEPOT: CNN based edge detection of 2D near surface potential field data. Computers & geosciences. Sep. 1, 2012;46:1-8. (Year: 2012).*

Chien JT, Bao YT. Tensor-factorized neural networks. IEEE transactions on neural networks and learning systems. Apr. 17, 2017;29(5):1998-2011. (Year: 2017).*

S. M. Bohte, J. N. Kok, and H. La Poutre. Error-backpropagation in temporally encoded networks of spiking neurons. Neurocomputing, 48:17-37, 2002.

W. Gerstner. Time structure of the activity in neural network models. Physical Review E, 51:738-758, 1995.

S. Ghosh-Dastidar, and H. Adeli. Improved spiking neural networks for EEG classification and epilepsi and seizure detection. Integrated Computer-Aided Engineering, 14(3), 187-212, 2007.

W. M. Kistler, W. Gerstner, and J. L van Hemmen. Reduction of hodgkin-huxley equations to a single-variable threshold model. Neural Computation, 9:1015-1045, 1997.

* cited by examiner (a) Same-Constants Composition (b) Different-Constants Composition

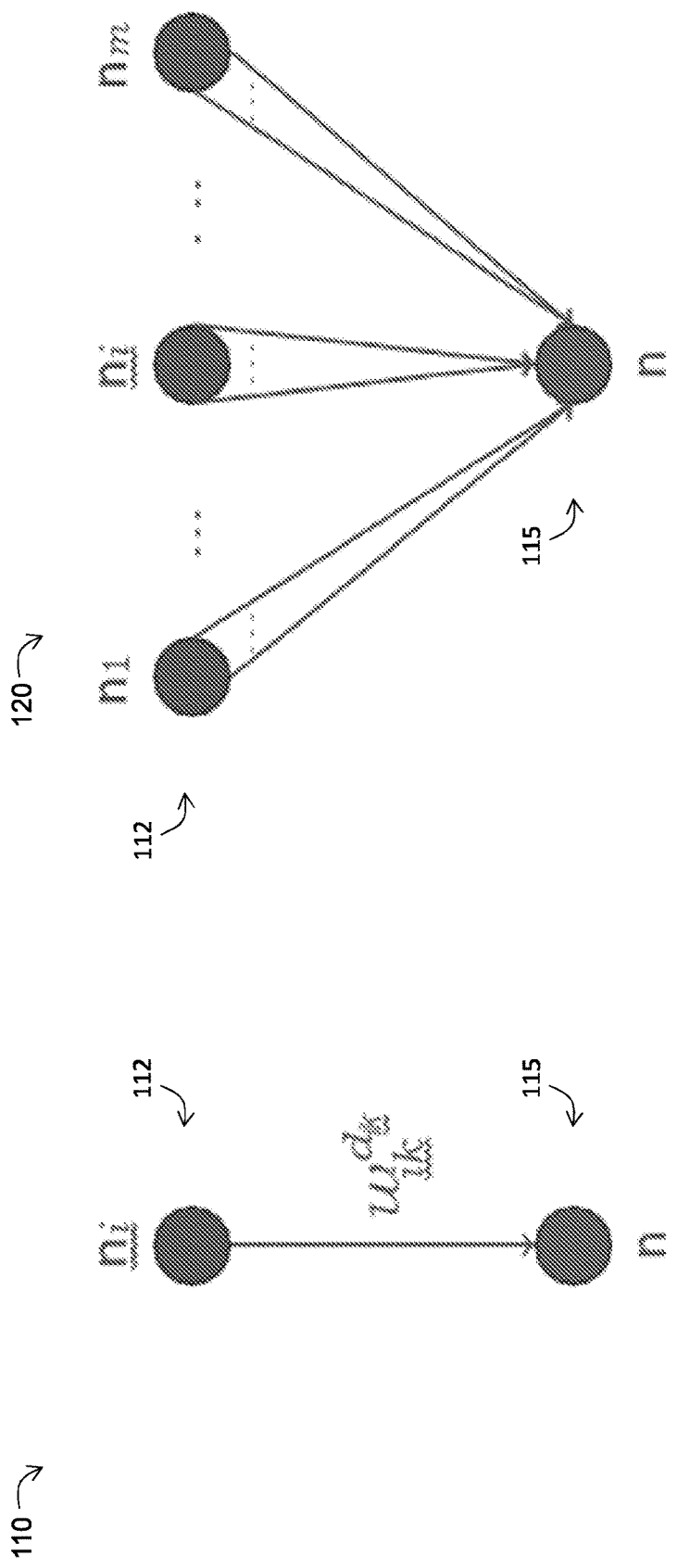
FIG. 6C (b) Neuron n and its presynaptic neurons.
FIG. 6B (a) Synapse with presynaptic and postsynaptic neurons.

(a) XOR definition    (b) Four constant functions

1800 →

| $w$ | $s[w^\uparrow]$ |
|-----|-----------------|
| 1.5 | 68 |
| 2.0 | 46 |
| 2.5 | 35 |
| 3.0 | 28 |
| 3.5 | 24 |
| 4.0 | 20 |
| 4.5 | 18 |
| 5.0 | 16 |
| 5.5 | ↑ |

| bSNN | (0,0) | (0,20) | (20,0) | (20,20) |
|---|---|---|---|---|
| $C_1 = (1.0, 1.5)\|_{\{(0,0)\}}$ | 35 | 47 | 43 | 55 |
| $C_2 = (1.5, 1.5)\|_{\{(0,20)\}}$ | 28 | 39 | 39 | 48 |
| $C_3 = (2.0, 2.5)\|_{\{(20,0)\}}$ | 18 | ↑ | 27 | 38 |
| $C_4 = (1.5, 3.5)\|_{\{(20,20)\}}$ | 16 | ↑ | ↑ | 36 |

| bSNN | (0,0) | (0,20) | (20,0) | (20,20) |
|---|---|---|---|---|
| $f_{35}[C_1]$ | 36 | ↑ | ↑ | ↑ |
| $f_{39}[C_2]$ | ↑ | 40 | ↑ | ↑ |
| $f_{27}[C_3]$ | ↑ | ↑ | 28 | ↑ |
| $f_{36}[C_4]$ | ↑ | ↑ | ↑ | 37 |

| SNN | (0,0) | (0,20) | (20,0) | (20,20) |
|---|---|---|---|---|
| $f_{63}[C_T]$ | ↑ | 64 | 64 | ↑ |
| $f_{64}[C_F]$ | 65 | ↑ | ↑ | 65 |

SYSTEM, APPARATUS AND METHOD FOR SPIKING NEURAL NETWORK

CROSS-REFERENCE TO RELATED APPLICATION

This non-provisional patent application claims the benefit of U.S. Provisional Application No. 62/633,644 filed on Feb. 22, 2018 and titled "Compositional Construction of Spiking Neural Networks", the entire content of which is incorporated herein by reference.

STATEMENT OF GOVERNMENT INTEREST

The invention described herein may be manufactured, used, and licensed by or for the Government of the United States for all governmental purposes without the payment of any royalty.

BACKGROUND

Supervised learning is an area of the machine learning field directed to construction of a function that maps an input to an output based on example input-output pairs. The function of interest may be inferred from labeled training data consisting of a set of training examples. An artificial neural network (ANN) is a computing system architecture loosely modeled after biological neural networks (e.g., the human brain). The neural network itself is not an algorithm, but rather a framework through which certain machine-learning algorithms may cooperate to process complex data inputs. Much of the work on neural networks (NNs) concerns training a neural network with a training set to compute some function of interest.

A Spiking Neural Network (SNN) is a network of artificial neurons and synapses that computes using as values the times at which neurons fire their spikes. The model of a neuron determines that time. In operation, an SNN is a function that maps input spike times to output spike times. The training set is a subset of the function that has been encoded in spike times. In typical SNN implementations, the output spike times in the training set are chosen from estimates that consider the architecture proposed for the SNN. Error backpropagation algorithms are then used to adjust the weights of the synapses, which entails making repeated passes through the entire network until the errors with respect to the outputs of the training set become acceptably small. Common error backpropagation algorithms frequently employ a large number of sum and sigmoid calculations, which may result in low efficiency and/or high computing overhead when dealing with a large volume of data.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIGS. 6B and 6C are schematic diagrams of spiking neural network (SNN) configurations illustrating single and multiple synapses, respectively, between presynaptic and postsynaptic neurons;

FIG. 18 is a table illustrating exemplary parameter values for neural network composition constructs according to embodiments of the disclosure;

FIG. 19 is a table illustrating exemplary parameter values for neural network composition constructs according to embodiments of the disclosure;

FIG. 20 is a table illustrating exemplary parameter values for neural network composition constructs according to embodiments of the disclosure;

DETAILED DESCRIPTION

Figure 1:
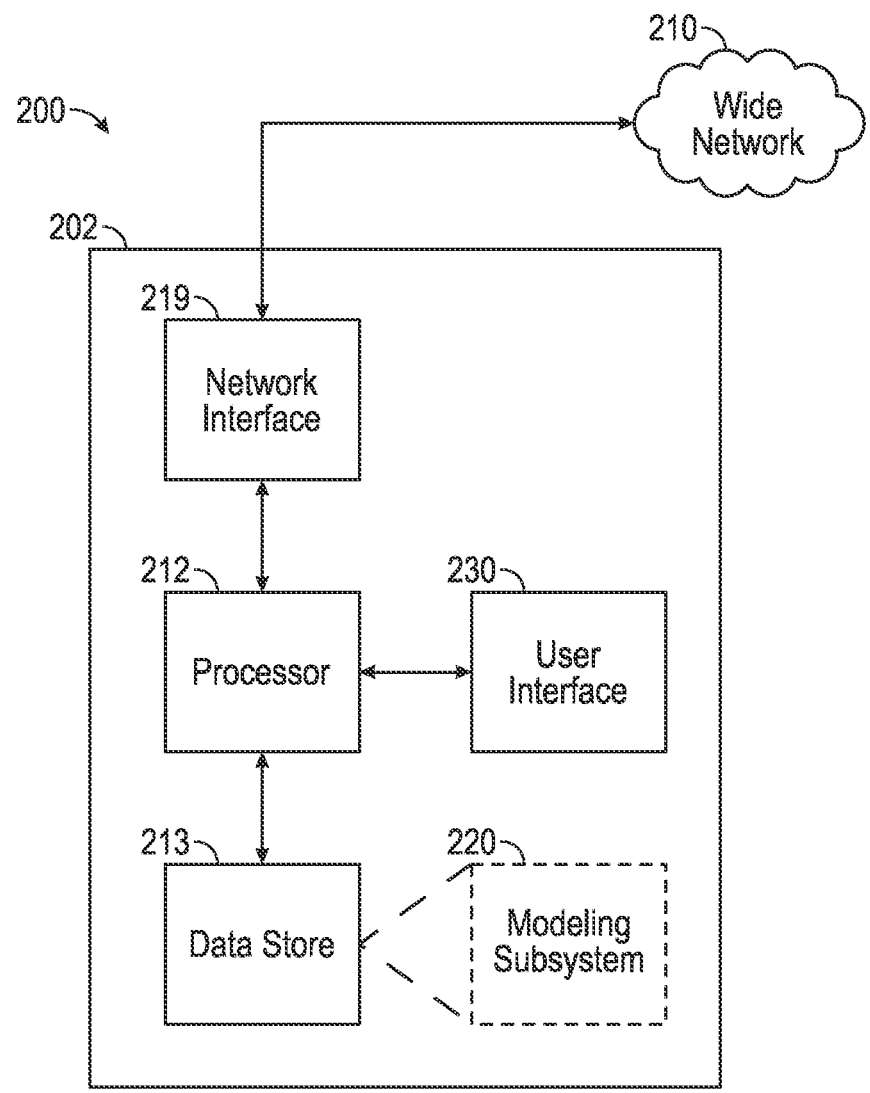
FIG. 1 is a schematic block diagram of a neural network design system, in accordance with embodiments of the disclosure.

Specific embodiments of the disclosure will now be described in detail with reference to the accompanying figures. While this disclosure is susceptible of being embodied in many different forms, there is shown in the drawings and will herein be described in detail specific embodiments, with the understanding that the present disclosure is to be considered as an example of the principles and not intended to be limited to the to the specific embodiments shown and described. In the description below, like reference numerals may be used to describe the same, similar or corresponding parts in the several views of the drawings.

Generally, the systems and methods disclosed herein may be characterized as a supervised learning solution, because the disclosed designs may utilize an input training set. As described above, traditional supervised learning approaches typically involve a) choosing an architecture of the neural network, b) providing the entire training set to the chosen architecture, and c) repeatedly adjusting parameters until errors become acceptably small. The disclosed method first partitions an input training set and then constructs neural networks for these smaller subfunctions (i.e. subsets of the training set). The component neural networks may then be combined into larger neural networks.

More specifically, the present disclosure relates to systems and associated methods of employing compositional construction of a neural network to yield a parametric network model architecture. The design systems and methods described herein advantageously exploit properties of the Spike-Response Model, taking as a guiding principle the property that defines the notion of a function, single-valued. NNs that compute larger functions are constructed from NNs that compute smaller functions, yielding parametric architectures. As such, the disclosed design supports transformations of an NN that preserve the function it computes: certain transformations may map to different output spike times, while others may preserve the output spike times. The present design method is scalable.

For example, and without limitation, embodiments of present disclosure may comprise a software-implemented process, stored on a computer-readable medium, such as a tangible computer-readable medium and executed by one or more computing devices, or processors. Referring to FIG. 1, in more detail, a neural network design system 200 (also referred to as a neural network modeling system or simply as a modeling system, in accordance with embodiments of the disclosure) may comprise a computing device 202 having a processor 212 that may be operable to access, accept and/or execute computerized instructions, and also a data store 213 which may access and/or store data and instructions used by the processor 212. More specifically, the processor 212 may be positioned in data communication with some number of the networked devices and may be configured to direct input from such networked devices to the data store 213 for storage and subsequent retrieval. For example, and without limitation, the processor 212 may be in data communication with external computing resources, such as the Internet 210, through a network interface 219. User interface 230 is operatively coupled to processor 212.

The computerized instructions of the neural network design system 200 may be configured to implement a Modeling Subsystem 220 that may be stored in the data store 213 and accessed and/or retrieved by the processor 212 for execution. The Modeling Subsystem 220 may be operable to access or receive and/or partition a training set, and then construct neural networks for these smaller subfunctions (i.e. subsets of the training set) as described in more detail hereinafter.

Those skilled in the art will appreciate that the present disclosure contemplates the use of computer instructions and/or systems configurations that may perform any or all of the operations involved in neural network design. The disclosure of computer instructions that include Modeling Subsystem 220 instructions is not meant to be limiting in any way. Those skilled in the art will readily appreciate that stored computer instructions and/or systems configurations may be configured in any suitable manner. Those skilled in the art also will understand that the principles of the present disclosure may be implemented on or in data communication with any type of suitably arranged device or system configured to perform neural network construction operations, in any combination.

Neural network composition may exploit certain features of the Spike-Response Model class of supervised learning solutions. For example, and without limitation, an SNN is a function that maps input spike times to output spike times, as described above. The concept of a function or map is defined by the single-valued property. A function is a single-valued relation.

Figure 2:
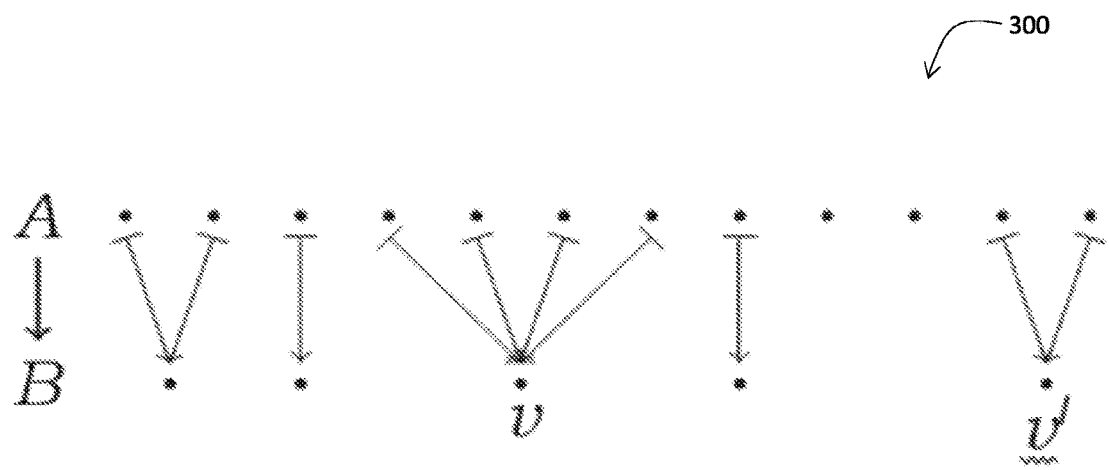
FIG. 2 is a schematic diagram of single-valued relation, in accordance with embodiments of the disclosure.

Referring now to FIG. 2, for example, and without limitation, a partial function $f$ 300 maps each element of the domain A to at most one element of the codomain B. An element $a \in A$ that $f$ does not map to an element in B is said to be undefined, which may be written as $f(a)\uparrow$. If mapped to some $b \in B$, $a$ is said to be defined, written $f(a)\downarrow$. A partial function is said to be total if, for each $a \in A$, $f(a)\downarrow$.

To implement a function $f: A \rightarrow B$ as an SNN the elements of set A and set B must be encoded as spike times. Thus, an SNN S that implements $f$ encodes the distinct $v, v' \in B$ with different spike times. In certain embodiments of the present design, this encoding is determined during the construction of S.

Figure 4:
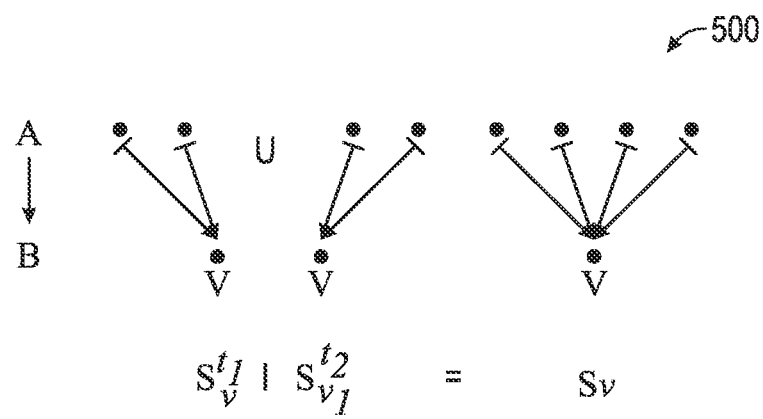
FIG. 4 is a schematic diagram and associated equation for same-constant composition, in accordance with embodiments of the disclosure.
Figure 5:
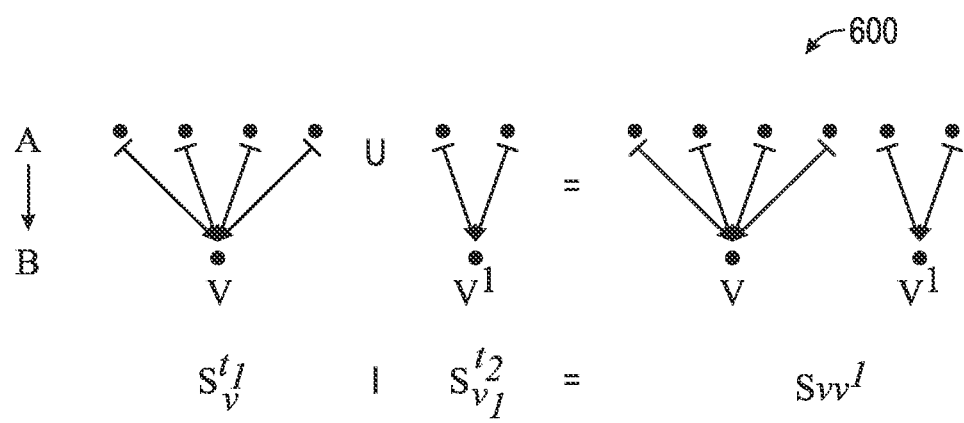
FIG. 5 is a schematic diagram and associated equation for different-constant composition, in accordance with embodiments of the disclosure.

Referring now to FIG. 4, for example, and without limitation, a construction of S may employ two subfunctions of $f$, each a respective constant function that evaluates to $v$. These two functions are shown as SNNs $S_v^{t_1}$ and $S_v^{t_2}$. One encodes $v$ by $t_1$, and the other by $t_2$. Same-constant composition 500 may construct an SNN $S_v$ that implements the union of the two (disjoint) constant functions, ensuring that there is a unique spike time to represent $v$. Referring now to FIG. 5, for example, and without limitation, different-constants composition 600 may construct from given SNNs $S_v^{t_1}$ and $S_{v'}^{t_2}$ which implement constant functions that evaluate to $v$ and $v'$, where $v \neq v'$, an SNN $S_{vv'}$, ensuring that distinct spike times encode $v$ and $v'$. Methods of exploiting the properties of a common model of a neuron, and the properties of some foundational SNNs, to define these composition operations are described in detail hereinbelow.

As described generally above, spiking neural networks (SNN) consist of neurons that fire spikes, and of synapses that connect neurons and transmit spikes. More specifically, a neuron has a membrane potential that may be affected by the spikes it receives from neighboring neurons. A neuron is also characterized by a threshold, which may be tunable. A neuron fires a spike when its membrane potential crosses the threshold from below. Each synapse may also be characterized by a weight $w$ and/or a delay $d$. Parameters of a neuron and its incoming synapses, the threshold of the neuron and the weights and delays of the synapses, may be chosen either to ensure that the neuron will spike or to prevent it from spiking.

As described generally above, the times at which neurons fire spikes are the values that SNNs use in computations. For example, a neuron may be defined as having a membrane potential $x$, which varies over time, and a threshold $\theta$. When the membrane potential crosses the threshold from below, the neuron fires a spike. FIG. 6B and FIG. 6C illustrate SNNs 110 and 120, respectively, as collections of neurons connected by synapses, represented by circles and arrows, respectively. The neuron before the synapse is presynaptic 112 to the one after the synapse, and the one after, is postsynaptic 115 to the one before. When a presynaptic neuron 112 fires, a spike is transmitted through synapses to its postsynaptic neurons 115. Neurons may be connected by zero, one or more synapses.

As spikes are transmitted through synapses, these spikes affect the membrane potential of the postsynaptic neuron 115. For example, and without limitation, in the Spike-Response Model, a spike-response function E captures the basic effect that a spike fired by a presynaptic neuron 112 causes on the membrane potential of the postsynaptic neuron 115. This model defines the membrane potential of a neuron as follows:

$$x(t) = \sum_{i=1}^{m} \sum_{k=1}^{K_i} w_{ik} \varepsilon(t - t_i - d_{ik})$$

Presynaptic neuron $n_i$ fires a spike at time $t_i$, and its $K_i$ synapses transmit it to neuron $n$, each according to its weight $w_{ik}$ and delay $d_{ik}$.

The membrane potential $x$ and the spike-response E functions have as domain the set of nonnegative real numbers $\mathbb{R}^{\geq 0}$, which is used to represent time, and as codomain the set of real numbers, used to represent the membrane potential of the neuron:

$x: \mathbb{R}^{\geq 0} \rightarrow \mathbb{R}$, $\varepsilon: \mathbb{R}^{\geq 0} \rightarrow \mathbb{R}$ Simulations of real-time systems often discretize time and examine the model of the system at times determined by the length of a step $\Delta$, the time step. Thus, the membrane potential also can be expressed as a function of discretized time, where the time at step $n \in \mathbb{N}$ is $t_n = n\Delta$, and delay $d_{ik} = \overline{d}_{ik} \Delta$, for some $\overline{d}_{ik} \in \mathbb{N}$.

The membrane potential of a neuron as a function of discretized time is defined as follows:

$\hat{x}^-: \mathbb{N} \rightarrow \mathbb{R}$ $$x^-(n) = \sum_{i=1}^{m} \sum_{k=1}^{K_i} w_{ik} \varepsilon((n - n_i - \overline{d}_{ik})\Delta)$$

The Shift Law may contribute substantively to the compositional method of constructing SNNs described herein and may be stated as follows: Shifting all inputs by $n'$ time steps, shifts the membrane potential by $n'$ time steps, also. Mathematically, the Shift Law may be described as follows:

$$x^-(n) = \sum_{i=1}^{m} \sum_{k=1}^{K_i} w_{ik} \varepsilon((n - n_i - \overline{d}_{ik})\Delta)$$
$$\Rightarrow \sum_{i=1}^{m} \sum_{k=1}^{K_i} w_{ik} \varepsilon(((n + n') - (n_i + n') - \overline{d}_{ik})\Delta)$$
$$= x^-(n + n')$$

A condition in ensuring the properties necessary for composition of SNNs is that a neuron spike at most once. The SNNs described hereinbelow possess this and other properties that describe how spikes propagate through an SNN.

A unary basic spiking neural network (bSNN) consists of one input neuron, one output neuron, and one synapse between them. The synapse may be characterized by a weight $w$ and a delay $d$. As described generally above, choice of the synaptic parameters $w$, $d$, and threshold $\theta$ may make it possible to ensure that an input spike $i$ will trigger a spike in the output neuron at some time $o$. When the transmission of a spike through a synapse is not immediate, a delay $d \geq 1$. Given a spike-response function $\varepsilon$, a time step of length $\Delta$, a synaptic delay $d$, and a synaptic weight $w$, the SNN just described is denoted by $\langle w^{\varepsilon, \Delta, d} \rangle$; when $\varepsilon$ and $\Delta$ are known, by $\langle w^d \rangle$; and when $d=1$, simply by $\rangle w \rangle$.

For a unary bSNN, only one presynaptic neuron is present for purposes of the membrane potential defined above. Some weight values might not produce a spike on the output neuron. For example, if the maximum value in the range of E is 1.0 and θ=1.0, any weight w<1.0 would prevent a spike in the output neuron. Thus, in this case ⟨w⟩ is not a total function. For weights that allow spikes, such as w≥1.0 for the example above, bSNN ⟨w⟩ maps 0 to the time step at which the membrane potential of the output neuron crosses the threshold θ. This time step is denoted by s⟨w⟩ and called the spike time of ⟨w⟩. Thus, for a unary bSNN ⟨w⟩ that is total: $\bar{x}(s⟨w⟩)=θ$.

The spike time $s⟨w^d⟩$ of a unary bSNN ⟨$w^d$⟩ is the time step at which the postsynaptic neuron fires when the presynaptic neuron fires at time step 0. For non-total bSNN ⟨$w^d$⟩, $s⟨w^d⟩↑$.

Figure 6A:
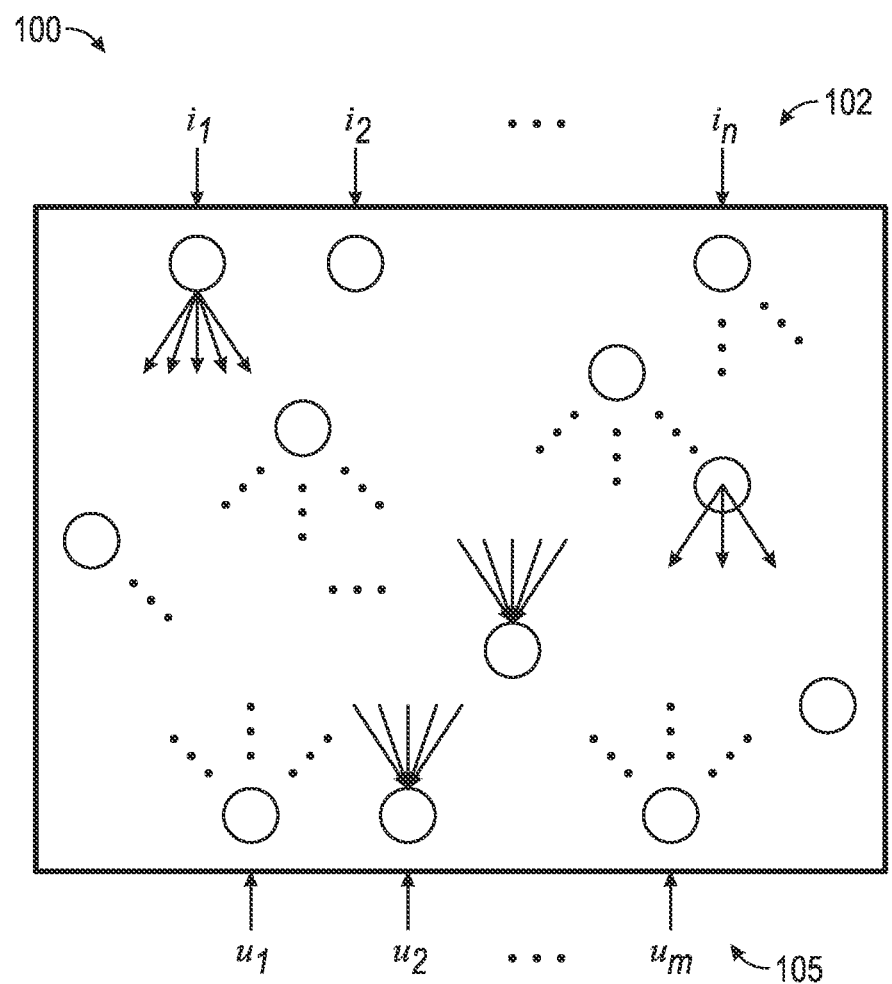
FIG. 6A is a schematic diagram of a neural network (NN)
Figure 6D:
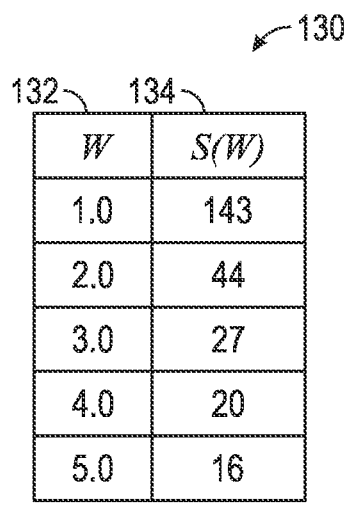
FIG. 6D is a table illustrating spike times for unary basic SNNs (bSNN)

FIG. 6D illustrates a table 130 showing spike times 134 for a few unary bSNNs 132 exhibiting the following parameters:

$ε(t)=t/δe^{1-t/δ}$, Δ=0.03, d=1, and approximation error 0.05.

Figure 6E:
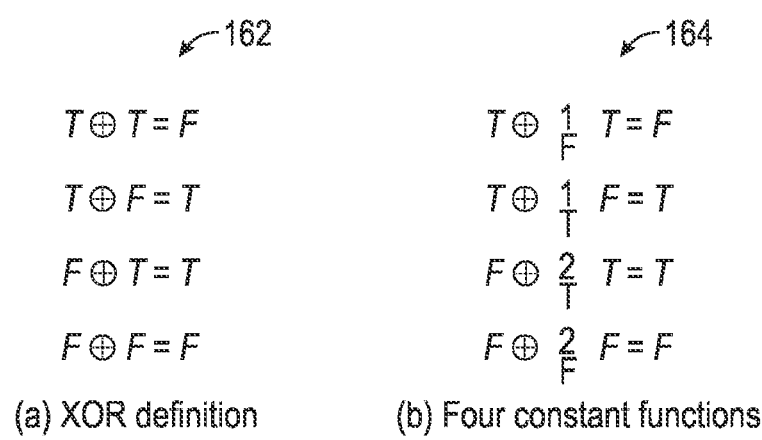
FIG. 6E is a definition of the XOR and associated constant functions.
Figure 6F:
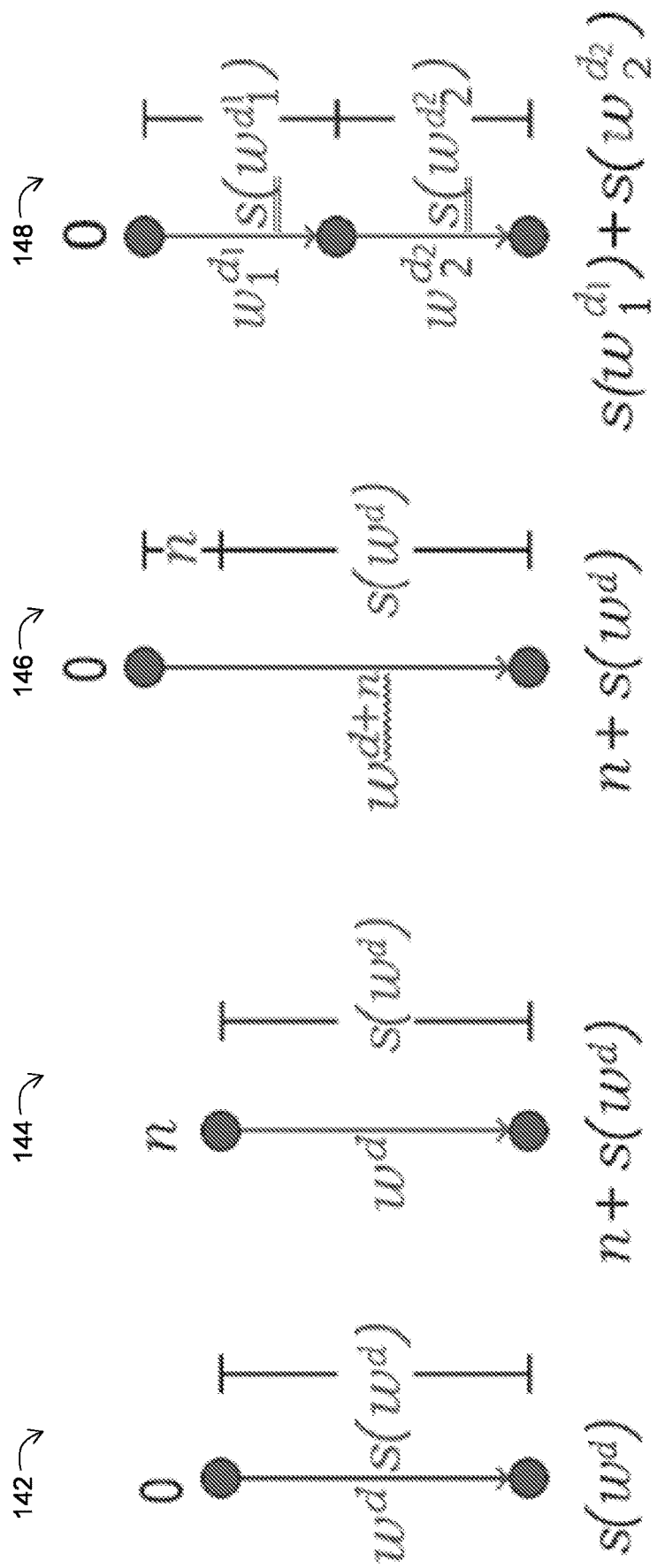
FIG. 6F is schematic diagrams of implementations of spike delay in a bSNN.

From the definition of membrane potential, and the Shift Law, it follows that the time at which the output neuron of a unary bSNN fires a spike may be delayed in several ways (as illustrated in FIG. 6F), basic firing 142 may be shifted by delaying 144 the input, by increasing the delay 146 of the synapse, or by vertically composing 148 the bSNN with another unary bSNN, whose output becomes the input of the one whose output is to be delayed). Thus, the spike time of a total unary bSNN is a time length that characterizes that bSNN. Because a given time length may be achieved in different ways, replacing a sequence of unary bSNNs by another one with the same time length transforms an SNN while preserving its output spike times.

For a unary bSNN ⟨w⟩ the input value for a complete description of the graph of the bSNN is 0. For any other input, the output may be obtained by the Shift Law. For a pair of inputs (x, y), the Shift Law suggests that it be reduced to one of the two forms below:

$\underline{c}(x,y)=(0,y-x)[x]$ if $x≤y$ $\underline{c}(x,y)=(x-y,0)[y]$ if $y≤x$ If an SNN maps (0, y−x) to n, then it maps (x, y) to n+x, and if it maps (x−y, 0) to n, then it maps (x, y) to n+y. The pair in the canonical representation of (x, y) may be referred to as its base, and the natural number in square brackets, its shift.

A binary basic spiking neural network (bSNN) consists of two input neurons and one output neuron, with each input neuron connected by a respective, or associated, single synapse to the output neuron. Similar to the unary bSNN described above, choices of synaptic parameters cause input spikes to trigger an output spike. For example, a binary bSNN consists of two input neurons $n_1$ and $n_2$; one output neuron n; and a single synapse of weight $w_i$ connecting $n_i$ to n, for i=1, 2. A binary bSNN ⟨$w_1^{d_1}$, $w_2^{d_2}$⟩ maps the pair of time steps at which the input neurons fire their spikes to the time step at which the output neuron fires its spike. The delays are omitted below, unless these delays are needed for some result. Thus, bSNN ⟨$w_1, w_2$⟩ has the following type:

⟨$w_1,w_2$⟩: $\mathbb{N}×\mathbb{N}→\mathbb{N}$.

To determine the behavior of ⟨$w_1, w_2$⟩ (i.e., its graph), a simulation need only consider bases of the canonical representations of pairs of natural numbers. A pair (0, n) indicates that $n_1$ fires its spike at (time step) 0, and $n_2$ fires its spike later at (time step) n. This representation may be written as (0, n)∈ [0]×$\mathbb{N}$, where [0] is the singleton set containing 0. A pair (n, 0)∈ $\mathbb{N}$×[0], in turn, indicates that $n_2$ fires its spike at 0, and $n_1$ fires its spike at n. The graph of a binary bSNN ⟨$w_1, w_2$⟩ is represented canonically by two functions, which have the following types:

⟨$w_1,w_2$⟩$^{0,·}$: [0]×$\mathbb{N}$→$\mathbb{N}$

⟨$w_1,w_2$⟩$^{·,0}$: $\mathbb{N}$×[0]→$\mathbb{N}$

Figure 6G:
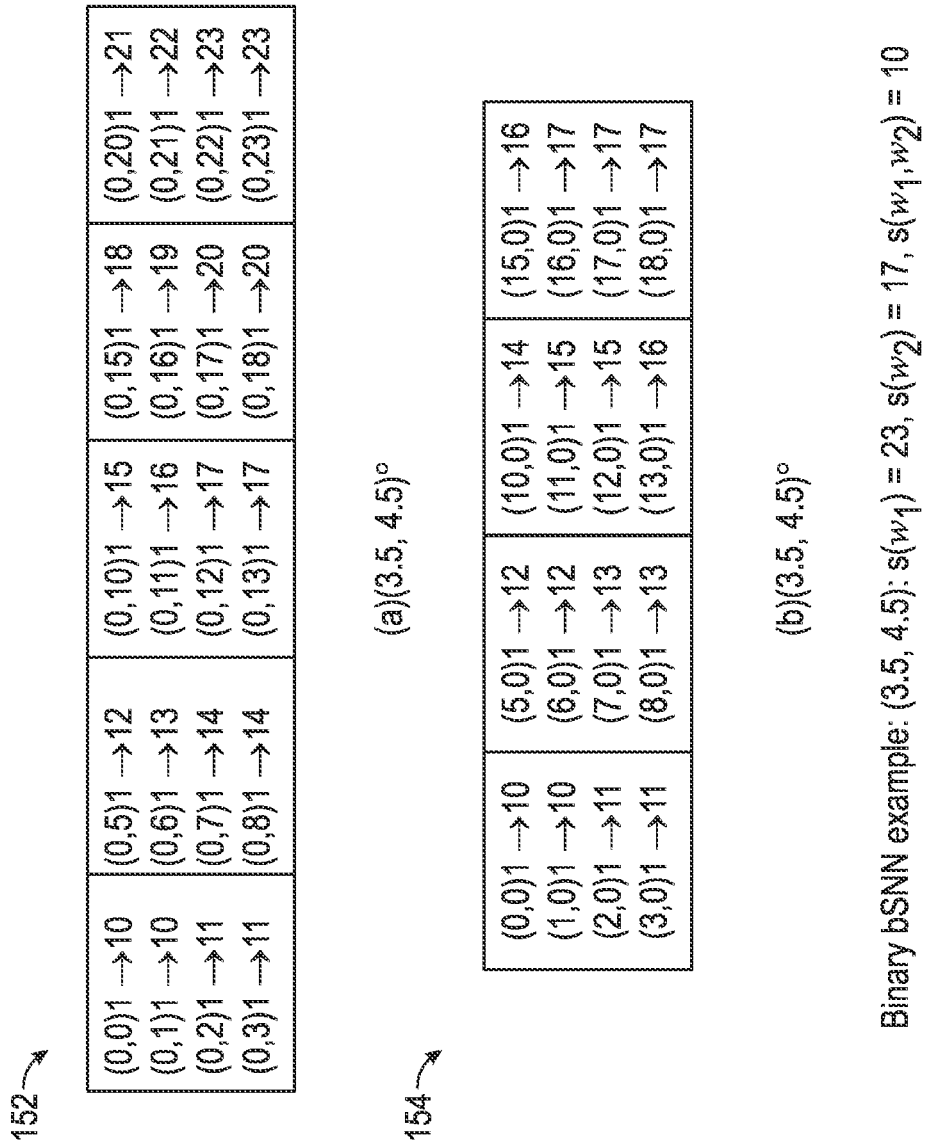
FIG. 6G is tables illustrating spike times for bSNN.

FIG. 6G shows the graph, as represented in 152 and 154 of bSNN ⟨3.5, 4.5⟩. The earliest spiking time occurs when both $n_1$ and $n_2$ fire their spikes at 0. When one fires its spike at 0 and the other is delayed, the output spike time is generally later. If the delay is long enough it allows the earlier input spike to be the sole cause of the output spike. The synaptic connection of $n_1$ has weight 3.5, and s⟨3.5⟩=23. If $n_2$ fires its spike at 23 or later, the output neuron either will be firing its spike concurrently or will have fired it already, and the spike from $n_2$ will have no effect on the output spike time. So, the output spike time remains constant when $n_2$ fires its spike at s⟨3.5⟩ or later. For the same reason, if $n_2$ fires its spike at 0, and $n_1$ at s(4.5)=17 or later, n will fire at 17, and $n_1$ has no effect on the spike time of the output neuron.

Letting s⟨$w_1, w_2$⟩ denote the output spike time for inputs (0, 0), and [n, m], the interval of naturals between n and m, inclusive, the pattern of graph of total binary bSNNs is as follows:

Let Δ be sufficiently small not to miss spikes, and unary bSNNs ⟨$w_1$⟩ and ⟨$w_2$⟩ be total. The graph of binary bSNN ⟨$w_1, w_2$⟩ has the following pattern:

$[0]×[0, s⟨w_1⟩] \xrightarrow{⟨w_1,w_2⟩^{·,0}} [s⟨w_1, w_2⟩, s⟨w_1⟩]$ $∀ (0, n)·n ≥ s⟨w_1⟩ ⇒ (0, n) ↦ s⟨w_1⟩$ $[0, s⟨w_2⟩]×[0] \xrightarrow{⟨w_1,w_2⟩^{·,0}} [s⟨w_1, w_2⟩, s⟨w_2⟩]$ $∀ (m, 0)·n ≥ s⟨w_2⟩ ⇒ (n, 0) ↦ s⟨w_2⟩$ Referring now to FIG. 6A, a neural network such as an SNN learns to compute a function $f: I→O$. In general, inputs and outputs of $f$ may be vectors or tuples:

$(i_1, ..., i_n)∈I$, for some n≥1

$(o_1, ..., o_m)∈O$, for some m≥1

A first element in this kind of training, a training set, is a finite subfunction of $f$: $f_T$. A finite function may be expressed as a set of pairs, each mapping an input to its corresponding output. The training set, it follows, is a finite function:

$f_T: I_T→O$ $I_T⊆I$ $f_T(i_1, ..., i_n)=f(i_1, ..., i_n)$ for $(i_1, ..., i_n)∈I_T$ If $|I_T|=N$, then $f_T$ may be written as a set of input-output pairs of size N as follows:

$(i_{1_{(1)}}, ..., i_{n_{(1)}}) ↦ (o_{1_{(1)}}, ..., o_{m_{(1)}})$ $(i_{1_{(2)}}, ..., i_{n_{(2)}}) ↦ (o_{1_{(2)}}, ..., o_{m_{(2)}})$ $⋮ ↦ ⋮$ $(i_{1_{(N)}}, ..., i_{n_{(N)}}) ↦ (o_{1_{(N)}}, ..., o_{m_{(N)}})$

As exemplified in FIG. 6A, the neural network 100 may receive the inputs 102 from the training set and, for each input, may produce an output 105. As shown, the neural network computes the following:

$$(i_{1_{(1)}}, \ldots, i_{n_{(1)}}) \mapsto (u_{1_{(1)}}, \ldots, u_{m_{(1)}})$$

$$(i_{1_{(2)}}, \ldots, i_{n_{(2)}}) \mapsto (u_{1_{(2)}}, \ldots, u_{m_{(2)}})$$

$$\vdots \mapsto \vdots$$

$$(i_{1_{(N)}}, \ldots, i_{n_{(N)}}) \mapsto (u_{1_{(N)}}, \ldots, u_{m_{(N)}})$$

From the discrepancies between the target outputs to be learned, the o's, and the actual outputs 105 of the neural network, the u's, some error measure is defined. A common error measure is $$E = \frac{1}{2} \sum_{k=1}^{m} (u_k - o_k)^2.$$

To reduce this error, adjustments may be made to parameters of the neural network being trained. For example, error backpropagation is commonly used to modify parameters of the neural network that determine the outputs that the network produces. In this error-correction method, certain input neurons receive some inputs 102 which may be modified by some parameters according to some activation function. The u's 105 that the neural network produces are a complex function that combines the activation functions of the constituents of the network. Backpropagation involves derivatives and activation functions are differentiable. The term backpropagation refers to the order in which this technique adjusts the parameters; beginning from the output neurons and propagating the adjustments through the entire network until they reach the input neurons.

An initial benchmark when evaluating learning algorithms is the Boolean XOR function, denoted herein with the symbol $\oplus$, such that $\oplus: \{T,F\} \rightarrow \{T,F\}$ T$\oplus$T=F
T$\oplus$F=T
F$\oplus$T=T
F$\oplus$F=F A neural network may represent the values T and F in some way. For example, to represent input Boolean values, T may be represented by 0 milliseconds (ms) and F by 6 ms; and to represent output Boolean values, T may be represented by 10 ms and F by 16 ms. One may apply the notation above: $f: I \rightarrow O$ as follows:

$I = \{0;6\}$ $O = \{10;16\}$

To distinguish between the function eventually implemented in (i.e., learned by) the neural network versus the machine-independent function, different fonts may be applied herein, as follows:

function learned by neural net: $f: I \rightarrow O$ $\oplus: \{0;6\} \rightarrow \{10;16\}$ machine-independent function: f: I→O $\oplus: \{T,F\} \rightarrow \{T,F\}$ The Boolean XOR function, with binary operator $\oplus$, is used herein to illustrate an approach for training and constructing SNNs by operating upon input and variable output, referred to herein as a construction training set. The spike times that encode Boolean values as inputs are chosen arbitrarily at the beginning of the process. The encoding of the Boolean values as outputs is determined by the construction of the SNN. The domain of XOR is of size four.

One way of designing an SNN that computes the XOR function is to compose four SNNs that compute constant functions: two that evaluate to T, and two that evaluate F, according to the definition of XOR (see FIG. 6E). FIG. 6E shows XOR function 162 and four constant function 164.

Figure 6H:
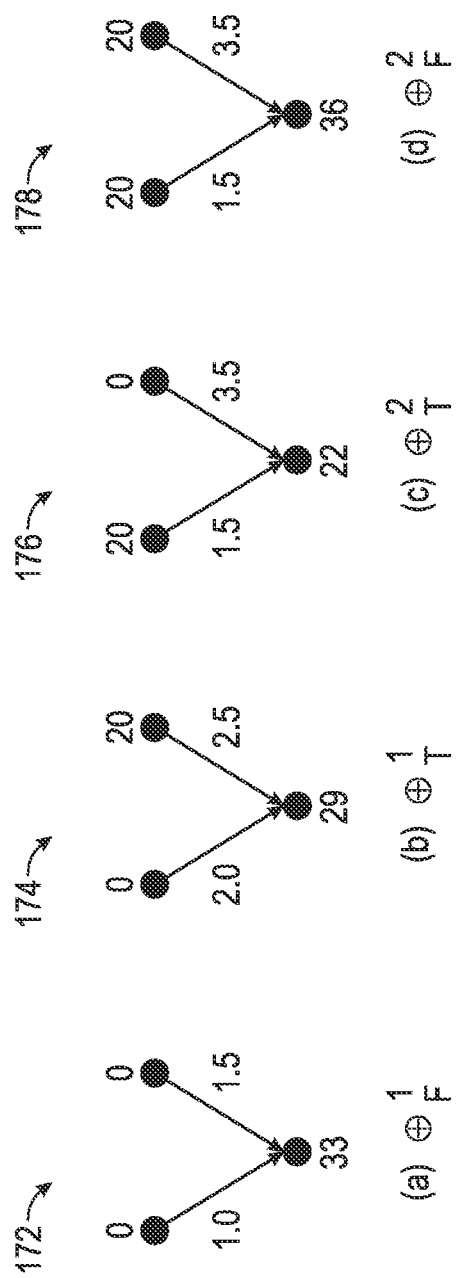
FIG. 6H is schematic diagrams of bSNNs implementing the constant functions of FIG. 6E.

For example, and without limitation, let an input T be encoded by spike time 0, and input F, by spike time 20. FIG. 6H illustrates four binary bSNNs 172, 174, 176 and 178 arbitrarily chosen to implement the constant functions 164 introduced in FIG. 6E. Each is a total function and determines the encoding of the output Boolean value for the function. Binary bSNN ⟨1.0, 5.5⟩ implements function $\oplus_F^1$, and encodes output F by spike time 33; while ⟨1.5, 3.5⟩ implements $\oplus_F^2$, and encodes output F by spike time 36. Constant functions $\oplus_T^1$, and $\oplus_T^2$, in turn, are implemented by ⟨2.0, 2.5⟩ and ⟨1.5, 3.5⟩ and encode output T by 29 and 22, respectively.

Building larger neural nets from smaller ones will now be described in more detail. For example, and without limitation, presume a training set of input-output pairs of size N is defined as described above (repeated as follows):

$$(i_{1_{(1)}}, \ldots, i_{n_{(1)}}) \mapsto (o_{1_{(1)}}, \ldots, o_{m_{(1)}})$$

$$(i_{1_{(2)}}, \ldots, i_{n_{(2)}}) \mapsto (o_{1_{(2)}}, \ldots, o_{m_{(2)}})$$

$$\vdots \mapsto \vdots$$

$$(i_{1_{(N)}}, \ldots, i_{n_{(N)}}) \mapsto (o_{1_{(N)}}, \ldots, o_{m_{(N)}})$$

This training set is partitioned into two training sets, thereby leading to construction of two neural networks that implement these training sets: $NN_1$ and $NN_2$. $NN_1$ may produce the correct result from the inputs in its training set, and similarly for $NN_2$. However, if these two networks are together in some fashion, it may be possible for an input to progress through both smaller neural networks, resulting in one having a correct output and the other (potentially) not. Consequently, restricted forms of composition are needed that guarantee a correct output.

Continuing as described above, consider the following function:

$f: I \rightarrow O$, and also some subfunction off that may serve as the abstract function from which the training set may be obtained:

$f_T: I_T \rightarrow O$.

Figure 3:
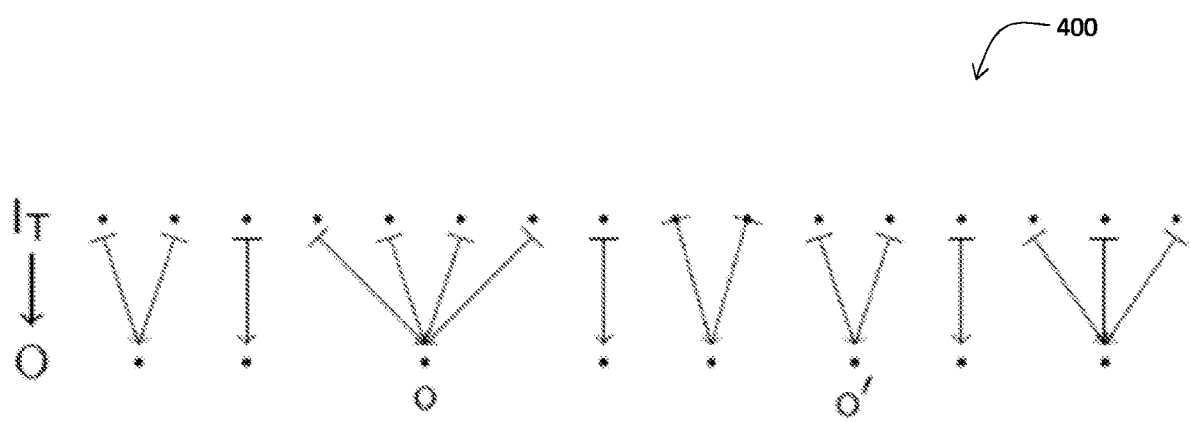
FIG. 3 is a schematic diagram of a function containing a training set, in accordance with embodiments of the disclosure.

FIG. 3 illustrates how this finite function can be represented pictorially 400. In the XOR example (as described above), o and o' were T and F (e.g., to obtain the training set from which to train the neural network, T was represented by 10 ms and F was represented by 16 ms). Representations of abstract values must satisfy the following conditions: 1) each abstract value must have a unique representation, and 2) different abstract values must have different corresponding representations.

In same-constant composition, the given SNNs implement functions that evaluate to the same constant, which each SNN may be encoding differently. For example, and without limitation, consider the bSNNs that implement XOR functions $\oplus_T^1$ and $\oplus_T^2$. These functions evaluate to the same constant, T. Let $C_1$=⟨2.0, 2.5⟩, and $C_2$=⟨1.5, 3.5⟩. The conditions to construct the composition SNN $C_1 \| C_2$ are as follows:

The designated domains of $C_1$ and $C_2$ are disjoint;
The designated domain of $C_1 \| C_2$ is the union of the designated domains of $C_1$ and $C_2$; and
For every element in the designated domain of $C_1 \| C_2$, the output neuron of the composition fires at the same time step.

Component $C_1$ evaluates input pair {(0, 20)}. The only outcome expected of $C_1$ concerns this designated domain, {(0, 20)}. Whether outputs for other inputs are defined or what values they have is not critical. Similarly, for component $C_2$, the designated domain is {(20, 0)}. The composition $C_1 \| C_2$ has the set {(0, 20), (20, 0)} as its designated domain.

These sample components are considered total functions. Each one triggers an output spike for the designated input of the other, its interfering output, as well as for its own designated input, its designated output.

Figure 7:
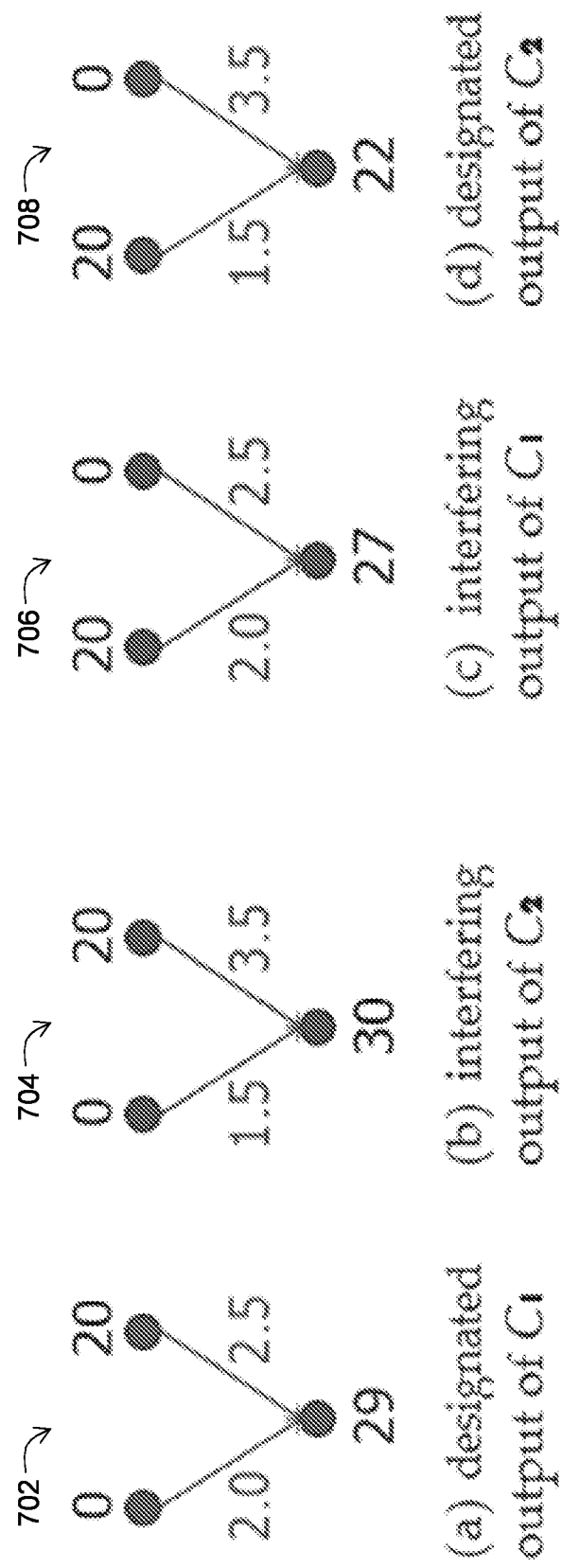
FIG. 7 is a schematic diagram illustrating designating and interfering outputs for neural network components, in accordance with embodiments of the disclosure.

FIG. 7 shows the designated (702, 708) and interfering (704, 706) outputs for both components. A condition to be satisfied in constructing the composition SNN $C_1 \| C_2$ is that its designated outputs be determined by the designated outputs of its components.

In the composition of two SNNs $C_1$ and $C_2$ that implement constant functions, each component may get inputs outside its designated domain, and produce interfering outputs which may be recognized and blocked by the neuron components of the modeling system 200 (as shown in FIG. 1). Because a component is implementing a constant, regardless of the size of the designated domain, the designated output is a constant spike time. The goal is to construct from a given component C, which implements a constant function with value c and has spike time s, a component C* which is a partial function, blocks all interfering outputs, and exhibits a spike time s*>s. Component C* will not spike for interfering outputs, and whenever spikes with designated output s, C* will spike at s*>s, the new designated output for the extended component.

Figure 8:
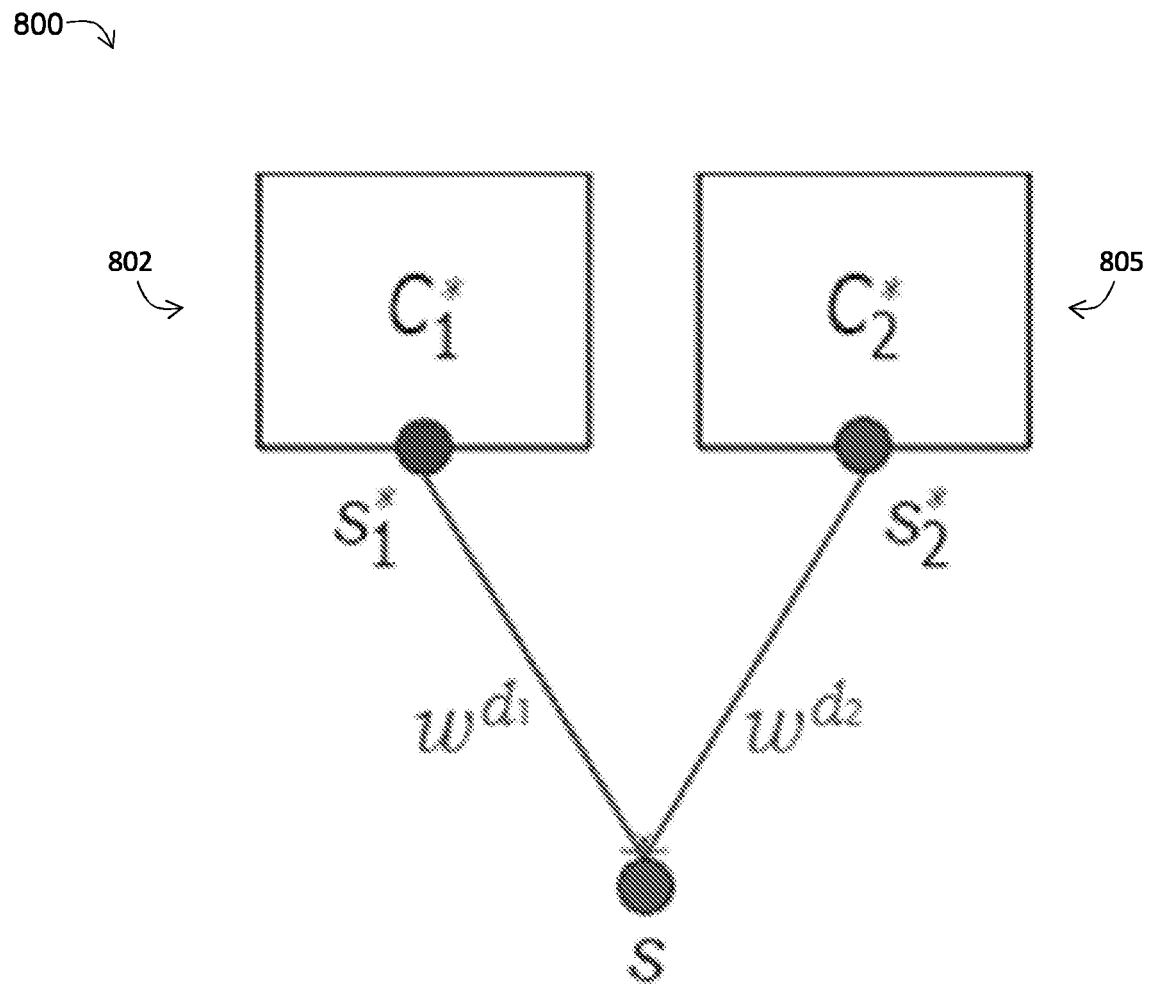
FIG. 8 is a schematic diagram for a same-constant composition construct, in accordance with embodiments of the disclosure.

Referring now to FIG. 8, constructs for same-constant composition 800 will now be described in detail. For example, and without limitation, same-constant composition may be characterized by the following:

Components $C_1$ and $C_2$ have disjoint designated domains, and designated spike times $s_1$ and $s_2$;

From each $C_i$, for i=1, 2, a partial SNN $C_i^*$ (802 and 805, respectively) that blocks interfering outputs is constructed with a new designated spike time of $s_i^* > s^i$; and To define a new spike time to represent the constant, two unary bSNNs, $\langle w_1^{d_1} \rangle$ and $\langle w_2^{d_2} \rangle$ may be introduced such that:

$$s = s_1^* + s \langle w_1^{d_1} \rangle = s_2^* + s \langle w_2^{d_2} \rangle$$

Under the assumption that $C_i^*$ spikes only for designated outputs, and the disjointness of the designated domains of $C_1^*$ and $C_2^*$, only one these components may spike for a given designated input of the composition. This ensures that for all designated inputs the designated output is s.

Figure 9A:
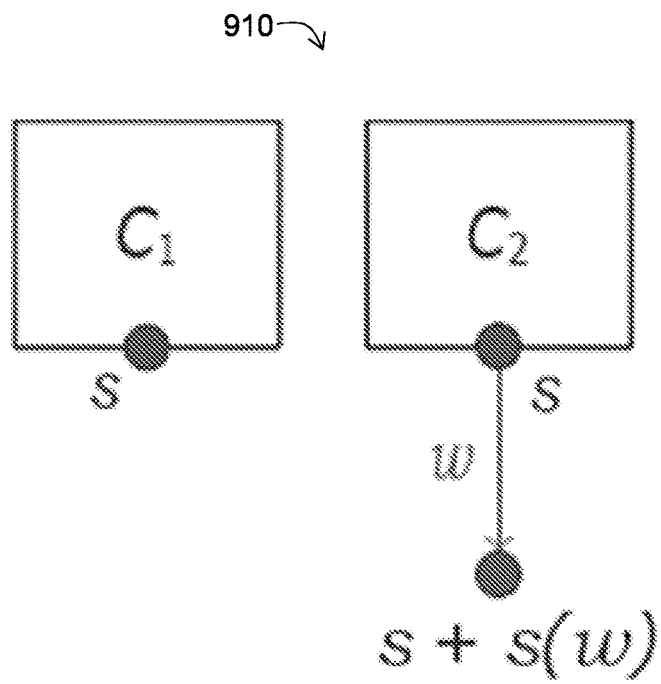
FIGS. 9A and 9B are schematic diagrams for different-constant composition constructs, in accordance with embodiments of the disclosure.

Different-constants composition takes component SNNs that implement different constant functions, $f^{c_1}$ and $f^{c_2}$ with $c_1 \neq c_2$, and may construct an SNN that implements a function with a range of size 2: $f^{c_1, c_2}$. Let $C_i$ be an SNN that implements constant function $f^{c_i}$, which evaluates to $c_i$, and which encodes $c_i$ by spike $s_i$, time for i=1, 2. For composition, the spike times that encode the distinct constants are required to be distinct also. If they are not, simply adding a unary bSNN to the output of one will ensure they are (see for example, and without limitation, composition 910 at FIG. 9A).

For example, and without limitation, different-constants composition may be characterized as follows:

The designated domains of the components are disjoint;
The component SNNs are partial functions that spike only for designated outputs; and
The components have different designated outputs.

Figure 9B:
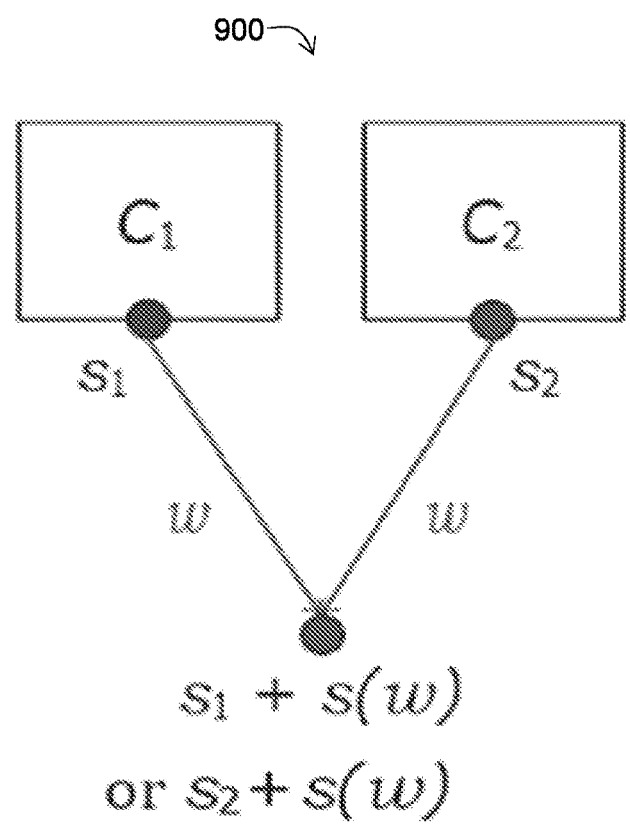

FIG. 9B (composition 900) shows the structure of $C_1 \lor C_2$. Given an input from its designated domain, only one of its components will fire a spike. If $C_1$ spikes at $s_1$ then $C_1 \lor C_2$ spikes at $s_1 + s \langle w \rangle$, and if $C_2$ spikes at $s_2$ then $C_1 \lor C_2$ spikes at $s_2 + s \langle w \rangle$. If the components are single-valued, and their output spike times are different, this composition is single-valued.

Figure 10:
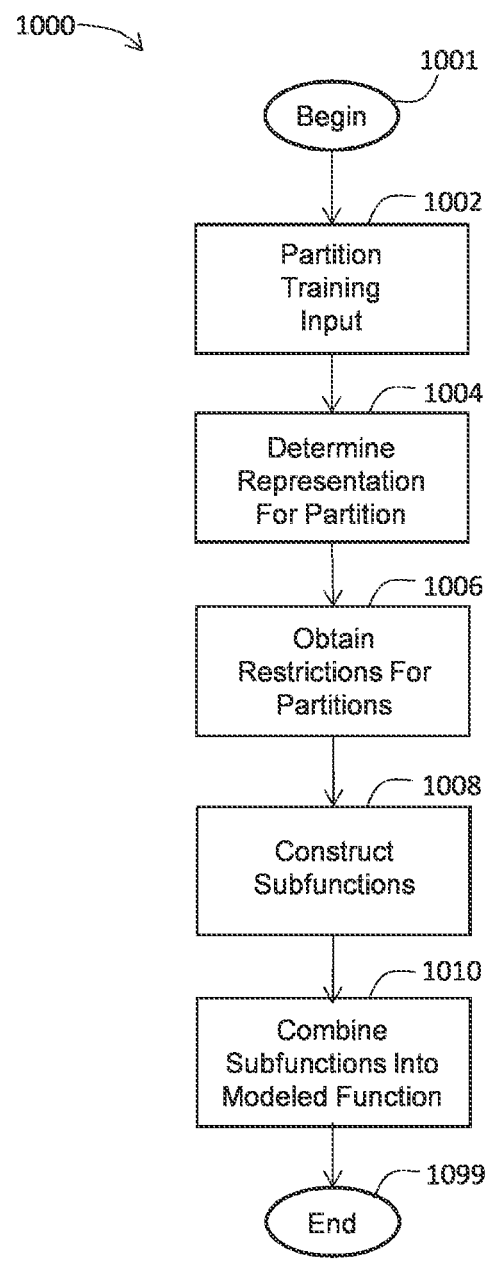
FIG. 10 is a flowchart for a method of compositional construction of a SNN, in accordance with embodiments of the disclosure.

Referring now to FIG. 10, an embodiment 1000 of compositional construction of a neural network is described in more detail. For example, and without limitation, a compositional construction of the XOR SNN, will be used to describe the disclosed method. Using the symbol $\oplus$ to signify the XOR function, this function is defined as follows:

$$\oplus: \{T, F\} \times \{T, F\} \to \{T, F\}$$

$T \oplus T = F$
$T \oplus F = T$
$F \oplus T = T$
$F \oplus F = F$

From the beginning at Block 1001, the present method may partition (Block 1002) the set of inputs of $I = \{T, F\} \times \{T, F\}$ of $\oplus$ such that $I = I_1 \cup \ldots \cup I_p$. These sets in the partition, by definition, are mutually disjoint (e.g., this representation 1004 may be a one-to-one function r: I→I). The representation may obtain a partition of I corresponding to that of I, as follows:

$$I = I_1 \cup \ldots \cup I_p$$

Each set $I_k$, for $k > \{1, \ldots, p\}$ may be used by the present method to obtain (at Block 1006) the restriction of $\oplus$ to $I_k$, written $\oplus | I_k$, and defined as follows:

$$\oplus | I_k: I_k \to O \text{ where } O = \{T, F\}$$

$$\oplus | I_k(i) \text{def} = \oplus(i) \text{ for } i \in k$$

At Block 1008, for each $k \in \{1, \ldots, p\}$, the present method may construct an SNN $\mathcal{N}_k$ to compute function $\oplus | I_k$. $\mathcal{N}_k$ may take inputs in $I_k$. The set $O_k$ of outputs produced may be determined during the construction of $\mathcal{N}_k$.

At Block 1010, the present method may construct an SNN $\mathcal{N}$ from $\mathcal{N}_1, \ldots, \mathcal{N}_p$ to compute the function of interest (e.g., the function $\oplus$), at which point the present method may end at Block 1099.

Taking certain of these process tasks in more detail in the context of the XOR benchmark, Block 1002 may comprise methods to partition $I = \{T, F\} \times \{T, F\}$, for example, and without limitation, as follows:

$$\{T,F\} \times \{T,F\} = \{(T,T)\} \cup \{(T,F)\} \cup \{(F,T)\} \cup \{(F,F)\}$$

At Block 1004, the present method may choose a representation for $I = \{T, F\} \times \{T, F\}$. For example, and without limitation, the present method may choose to represent each Boolean value the same regardless of whether it occurs in the first or the second element of an input pair, as follows:

Let $r_1: \{T, F\} \to \mathbb{N}$
$r_1(T) = 0$
$r_1(F) = 20\Delta$; where $\Delta$ is some time-step parameter
(note: $\Delta$ is omitted below, as it will be implicit in all inputs and outputs)
Then $r: \{T, F\} \times \{T, F\} \to \mathbb{N} \times \mathbb{N}$
$r(B_1, B_2) = (r_1(B_1); r_1(B_2))$ for $B_1, B_2 \in \{T, F\}$
The partition of the representation of inputs is as follows:

$$\{0,20\} \times \{0,20\} = \{(0,0)\} \cup \{(0,20)\} \cup \{(20,0)\} \cup \{(20,20)\}$$

At Block 1006, the present method may obtain the restrictions of $\oplus$ to the sets in the partition of I, as follows:

$\oplus I\{(T,T)\}=\oplus 1/F=\{(T,T)\mapsto F\}$ $\oplus I\{(T,F)\}=\oplus 1/T=\{(T,F)\mapsto T\}$ $\oplus I\{(F,T)\}=\oplus 2/T=\{(F,T)\mapsto T\}$ $\oplus I\{(F,F)\}=\oplus 2/F=\{(F,F)\mapsto F\}$ At Block 1008, the present method may construct SNNs for $\oplus I\{(T, T)\}$; $\oplus I\{(T, F)\}$; $\oplus I\{(F, T)\}$; $\oplus I\{(F, F)\}$.

Figure 11:
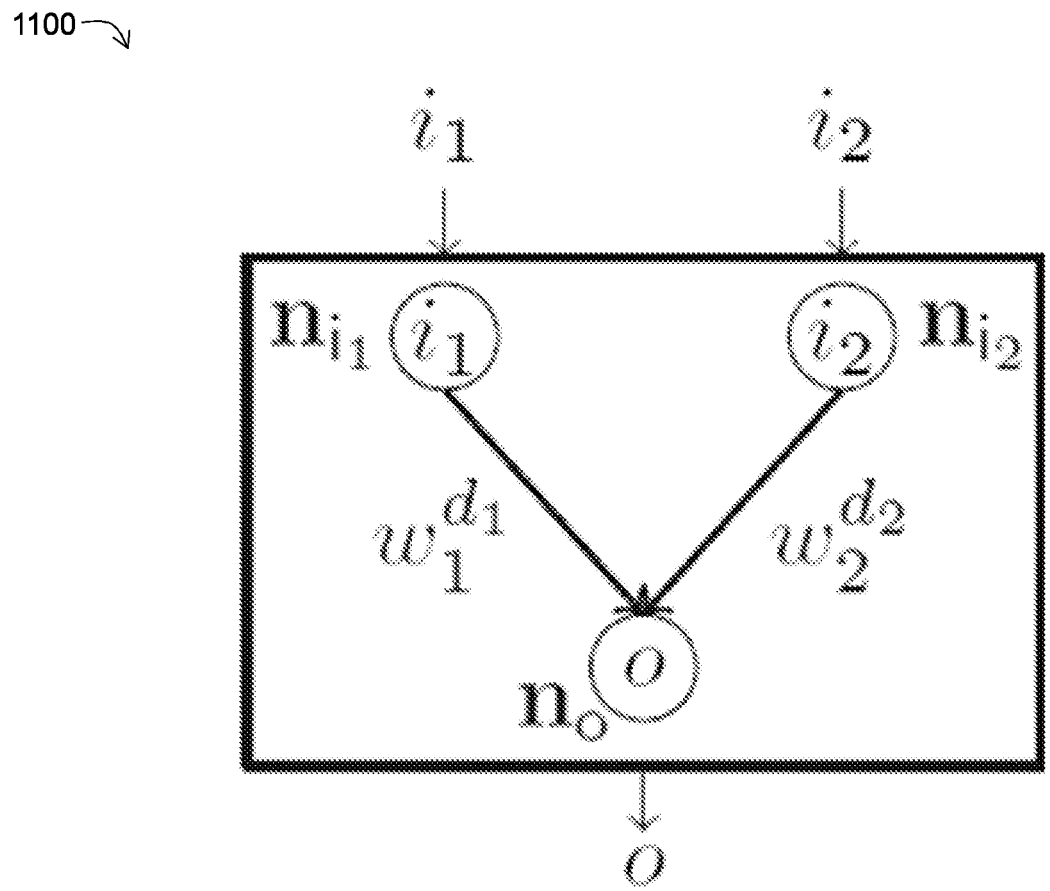
FIG. 11 is a schematic diagram for exemplary neural network composition constructs in accordance with embodiments of the disclosure.

A binary SNN (bSNN) has two input neurons, one output neuron, and one synaptic connection between each input neuron and the output neuron (see, for example, FIG. 11). As shown, a binary bSNN 1100 is a function comprising inputs that are pairs of spike times ($i_1$; $i_2$) (i.e., the times at which neurons $n_{i1}$ and $n_{i2}$ fire spikes). A binary bSNN is a function that either produces no output or a single output o (e.g., no output when no doesn't fire a spike; o, the time at which $n_o$ fires a spike). A neuron fires a spike when its membrane potential x crosses its threshold θ from below. According to the Spike-Response model of the neuron, the membrane potential of the output neuron no at time t is given by the following formula:

$$x(t)=w_1\varepsilon(t-i_1-d_1)+w_2\varepsilon(t-i_2-d_2)$$

where $w_1$ and $d_1$ are the weight and delay parameters of the synapse connecting $n_{i1}$ to the output neuron no. The basic spike response or effect caused by a spike received by a neuron is given by some function ε. Inputs $i_1$ and $i_2$ are the spike times of $n_{i1}$ and $n_{i2}$, respectively. Neuron $n_o$ fires a spike at o when $\theta=x(o)=w_1\varepsilon(o-i_1-d_1)+w_2\varepsilon(o-i_2-d_2)$.

As described above, in some neural network design approaches, the outputs are chosen first and then the arbitrarily chosen original parameters of the network are readjusted by backpropagation until the network produces an output sufficiently close to the one chosen in advance. In the disclosed method, the output neuron fires a spike (that is, merely that there be an o that satisfies the above equation). Parameters θ, $w_1$, $w_2$, $d_1$, $d_2$ and even the function ε may be chosen so as to obtain this equation. Different choices may lead to different values of o, which means that these choices may yield different SNNs that compute the same abstract function. Exemplary choices yielding such SNNs will now be discussed in detail.

An SNN to compute $\oplus I_{\{(T, T)\}}$: Consider the simple abstract function $\oplus I_{\{(T, T)\}}$. After having chosen 0 to represent an input T, and instantiating the parameters as follows,
θ=1.0
$d_1=d_2=1$
$w_1=1.0$ and $w_2=1.5$
Δ=0.03
δ=0.02, where real numbers x, y are considered equal if |x−y|<=δ and the spike response function with τ=6; applying the formula:

$$\varepsilon(t) = \begin{cases} \frac{t}{\tau}e^{1-\frac{t}{\tau}} & t \geq 0 \\ 0 & t \leq 0 \end{cases}$$

yields an output spike time of o=35.

Figure 12:
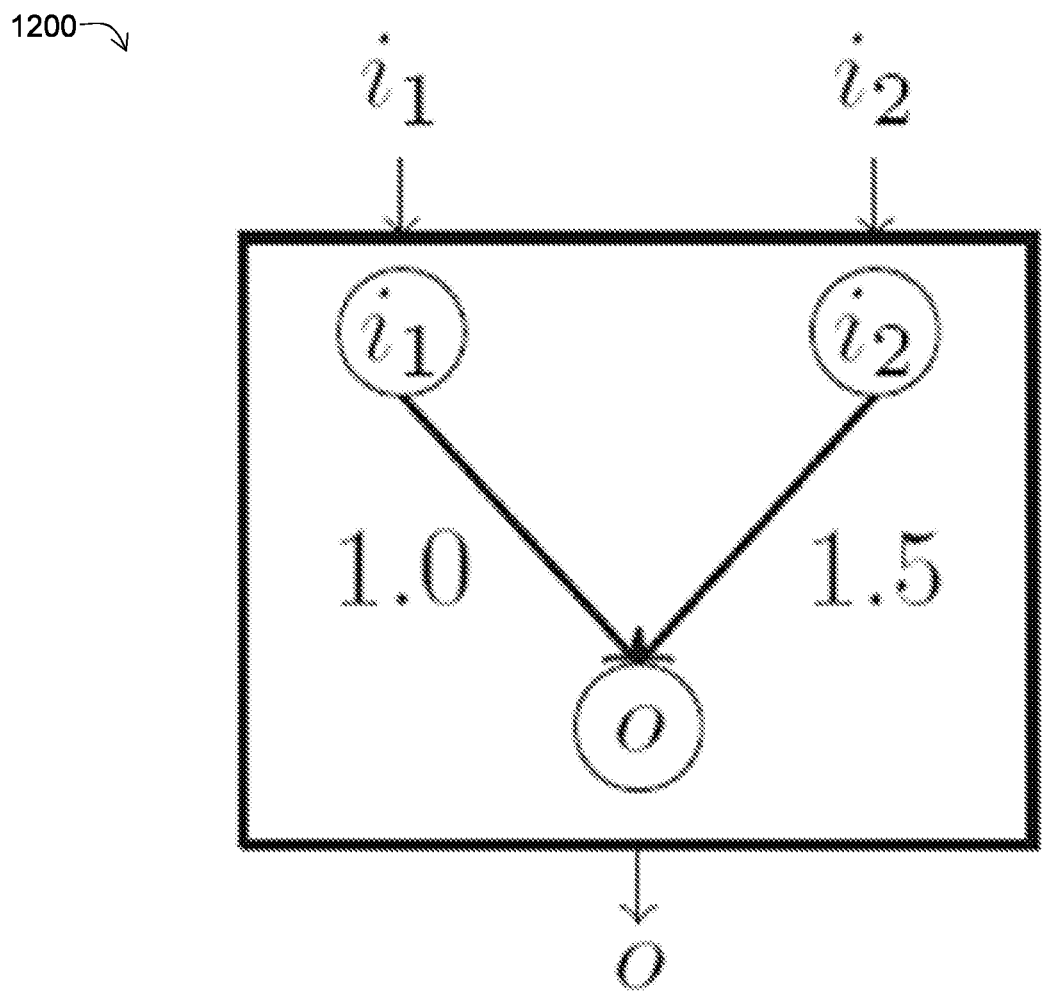
FIG. 12 is a schematic diagram for exemplary neural network composition constructs in accordance with embodiments of the disclosure.

Since the output of the abstract function $\oplus I_{\{(T, T)\}}$ is F, the choice of parameters has determined that this SNN represents output F by 35. Without loss of generality, in constructing the other subfunctions below, the same instantiations of parameters, except the weights, are kept (the constant parameters are omitted in the diagrams below). For example, and without limitation, function $\oplus I\{(T, T)\}$ is computed by the binary bSNN 1200 illustrated in FIG. 12. More specifically, SNN ‹1.0, 1.5› maps (0, 0)→35 (that is, it represents output F by 35. At this stage implementation of $\oplus I\{(T, T)\}$, whose input is (0, 0), is of primary significance. Using the notation for restriction of function used above, this result may be written as follows:

‹1.0, 1.5›$|_{\{(0,0)\}}$: {(0, 0)}→{35} computes $\oplus I_{\{T, T\}}$: {(T, T)}→{F}

Figure 13:
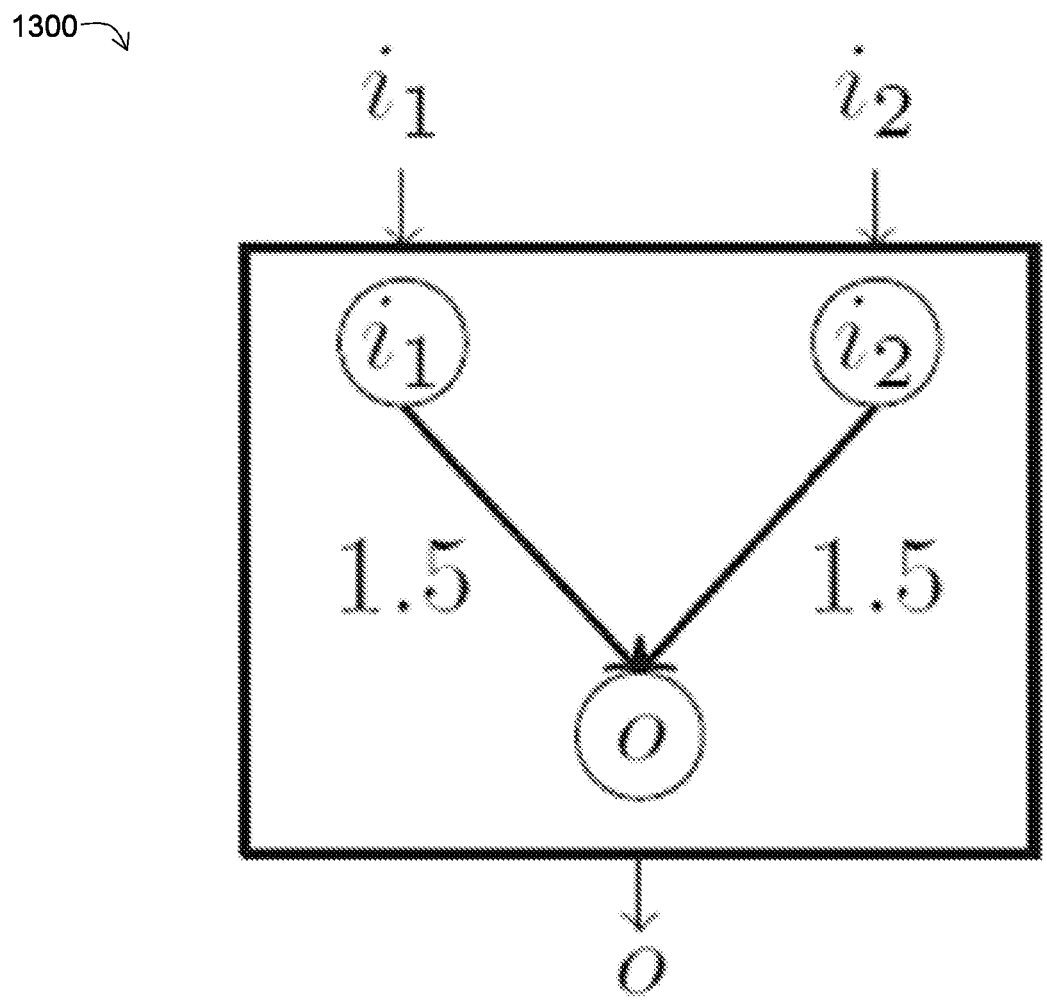
FIG. 13 is a schematic diagram for exemplary neural network composition constructs in accordance with embodiments of the disclosure.

An SNN to compute $\oplus I_{\{(T, F)\}}$: This abstract function may be defined as $\oplus I_{\{(T, F)\}}$: {(T, F)}→{T}. Some pair of weights that allows the output neuron to fire a spike may be found: pair $w_1=1.5$, $w_2=1.5$ does so (see, for example, SNN 1300 at FIG. 13). Therefore, SNN ‹1.5, 1.5› maps (0, 20)→39 (that is, it represents T by 39). Expressed in notation for restriction, this result is as follows:

‹1.5,1.5›$|_{\{(0,20)\}}$: {(0,20)}→{39} computes $\oplus I_{\{(T,F)\}}$: {(T,F)}→{T}

Figure 14:
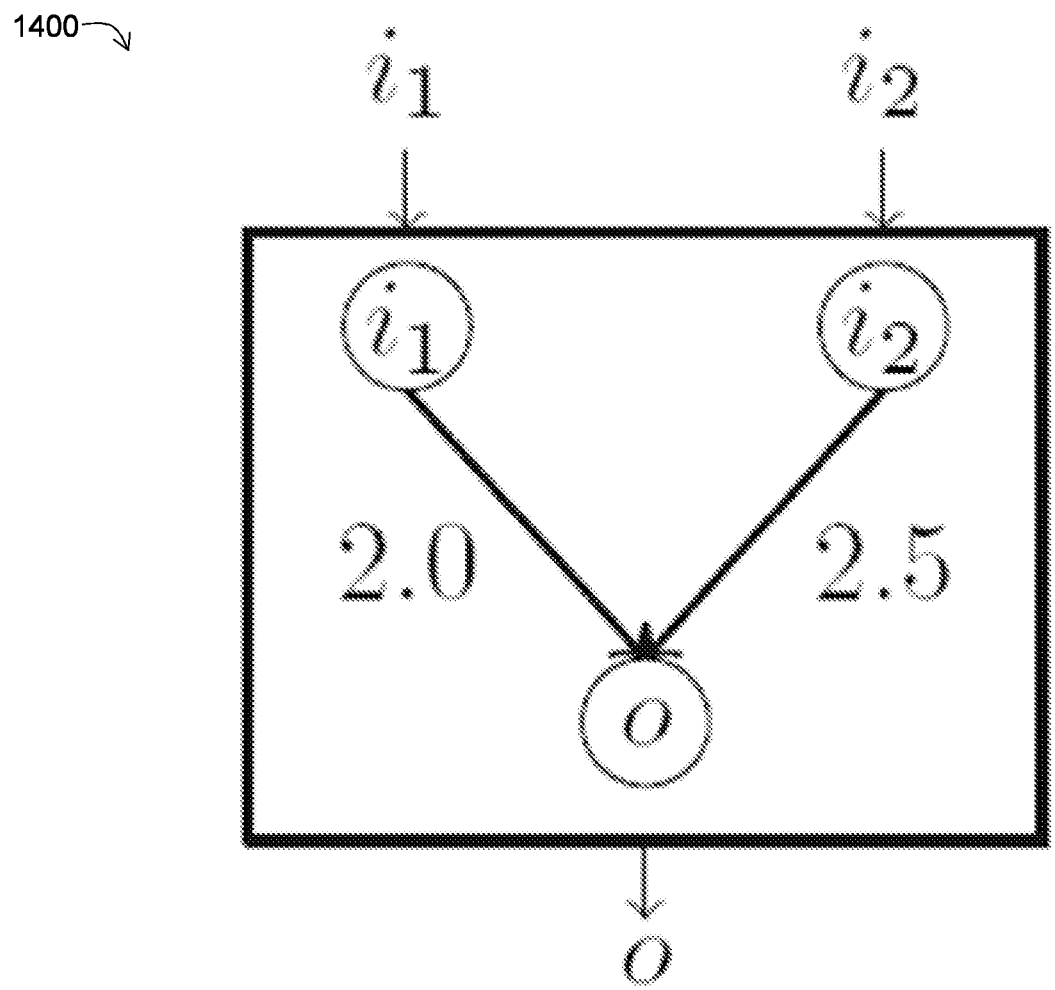
FIG. 14 is a schematic diagram for exemplary neural network composition constructs in accordance with embodiments of the disclosure.

An SNN to compute $\oplus I_{\{(F, T)\}}$: This abstract function may be defined as $\oplus I_{\{(F, T)\}}$: {(F, T)}→{T}. One possible SNN 1400 that may compute this function is shown at FIG. 14. Therefore, SNN ‹2.0, 2.5› maps (20, 0)→27 (that is, it represents output T by 27), which may be expressed in the following notation for restriction:

‹2.0, 2.5›$|_{\{(20,0)\}}$: {(20, 0)}→{27} computes $\oplus I_{\{(F, T)\}}$: {(F, T)}→{T}

Figure 15:
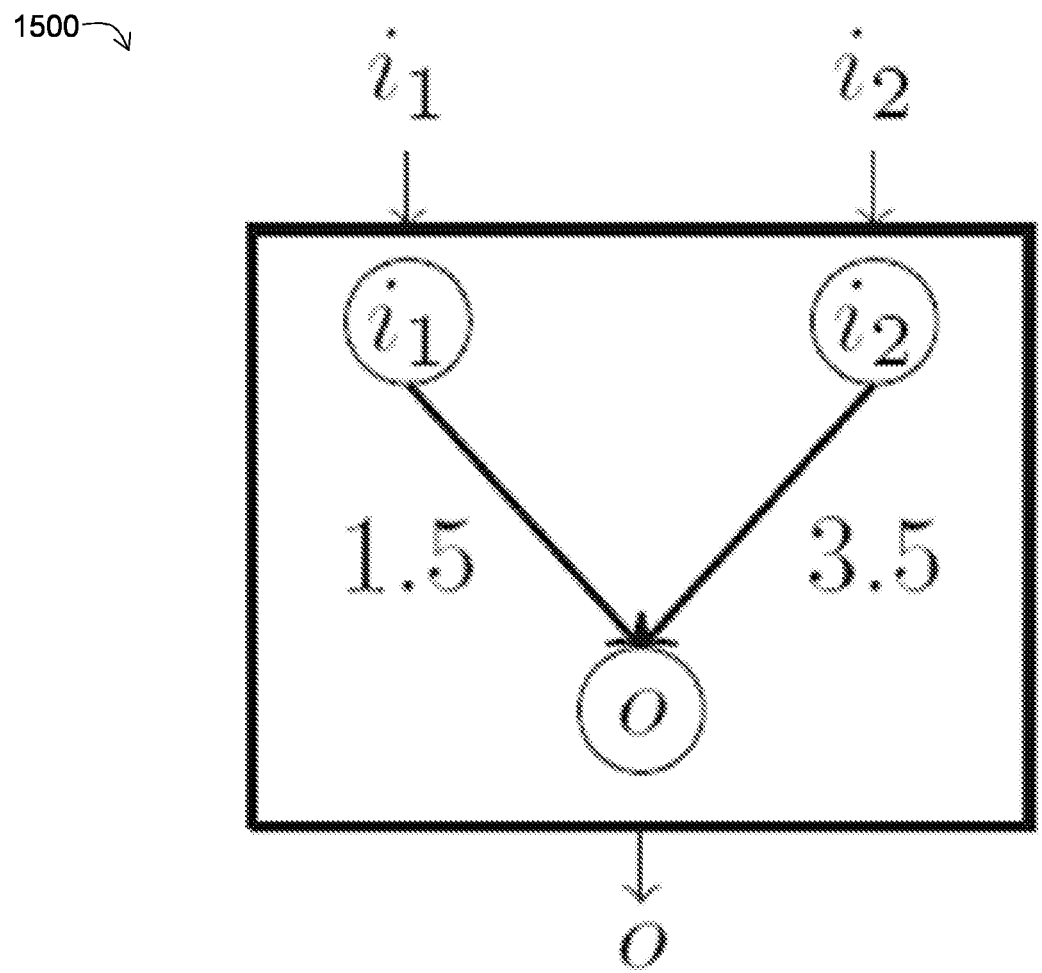
FIG. 15 is a schematic diagram for exemplary neural network composition constructs in accordance with embodiments of the disclosure.

An SNN to compute $\oplus I_{\{(F, F)\}}$: This abstraction function may be defined as $\oplus I_{\{(F, F)\}}$: {(F, F)}→{F}. One possible SNN 1500 that may compute this function is shown at FIG. 15. Therefore, SNN ‹1.5, 3.5› maps (20, 20)→36 (that is, it represents output F by 36, which may be expressed in the following notation for restriction:

‹1.5, 3.5›$|_{\{(20,20)\}}$: {(20, 20)}→{36} computes $\oplus I_{\{(F, F)\}}$: {(F, F)}→{F}

The abstract functions determined above comprise the following component SNNs:

| SNN computes function | |
|---|---|
| ‹1.0, 1.5› $|_{\{(0,0)\}}$: {(0, 0)} ↦ {35} | $\oplus I_{\{(T, T)\}}$: {(T, T)} ↦ {F} |
| ‹1.5, 1.5› $|_{\{(0,20)\}}$: {(0, 20)} ↦ {39} | $\oplus I_{\{(T, F)\}}$: {(T, F)} ↦ {T} |
| ‹2.0, 2.5› $|_{\{(20,0)\}}$: {(20, 0)} ↦ {27} | $\oplus I_{\{(F, T)\}}$: {(F, T)} ↦ {T} |
| ‹1.5, 3.5› $|_{\{(20,20)\}}$: {(20, 20)} ↦ {36} | $\oplus I_{\{(F, F)\}}$: {(F, F)} ↦ {F} |

Figure 16:
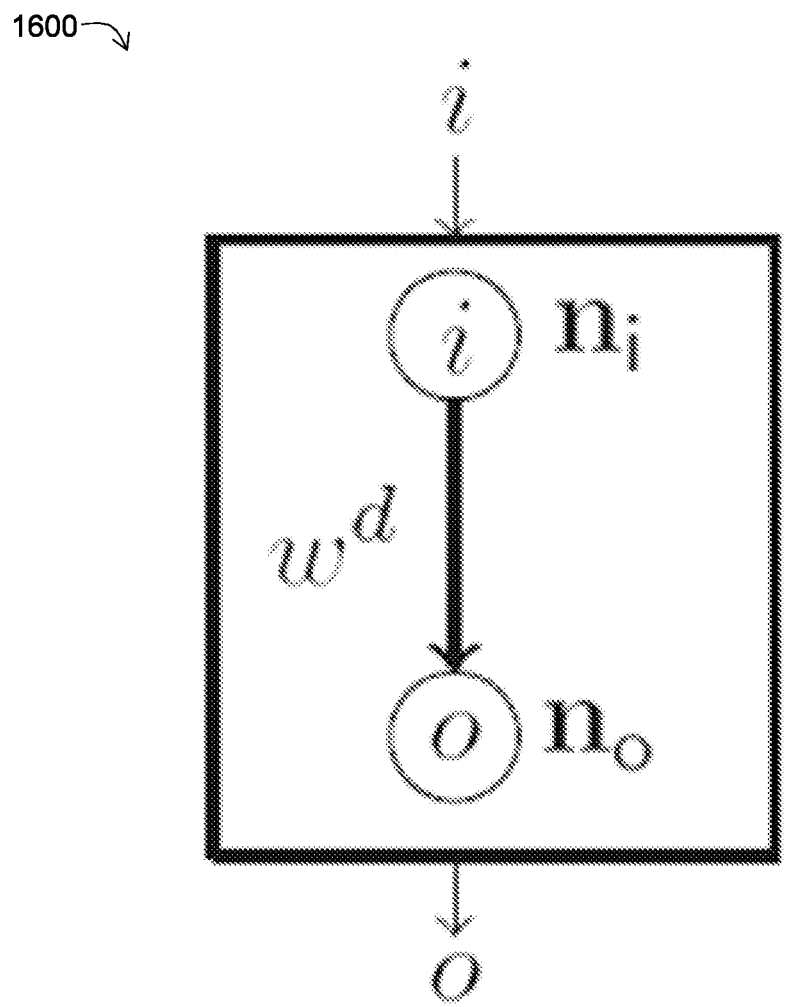
FIG. 16 is a schematic diagram for exemplary neural network composition constructs in accordance with embodiments of the disclosure.

As described above, one building block for neural network composition is a unary basic SNN (bSNN) 1600 (see FIG. 16), which comprises one input neuron, one output neuron, and one synaptic connection between them. The membrane potential of the output neuron no at time t is given by the formula $x(t)=w\varepsilon(t-i-d)$, where w and d are the weight and delay parameters of the synapse connecting input neuron $n_i$ to the output neuron no. Neuron $n_o$ fires a spike at o when $\theta=x(o)=w\varepsilon(o-i-d)$. By choice of parameters w, d, θ, it is possible to either ensure that input i will trigger a spike at o, or to prevent there being an o that will satisfy this equation, thus, blocking a spike. The spike time of neuron no may be denoted by s‹$w^d$›, when the input (spike) is (at) 0, for synaptic parameters weight w and delay d, and threshold θ is known. More generally and explicitly, the time between the input spike time i and the output spike time o, may be denoted s‹$w_\theta^d$› such that o=i+s‹$w_\theta^d$›.

Figure 17:
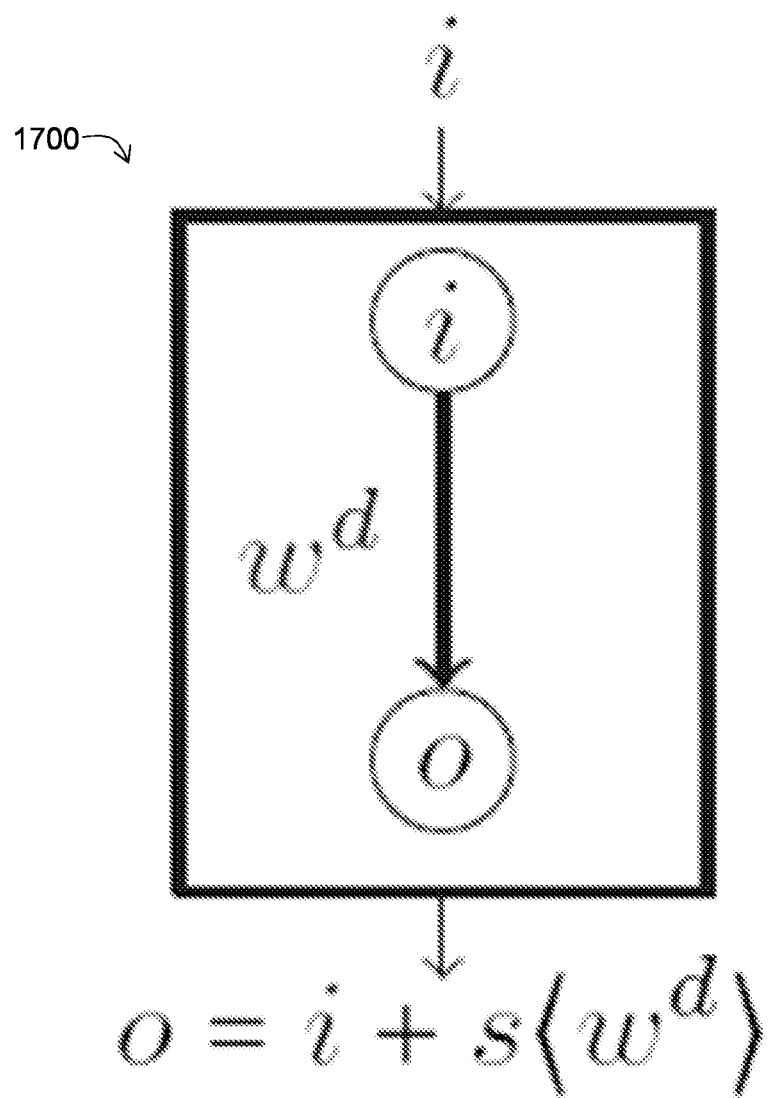
FIG. 17 is a schematic diagram for exemplary neural network composition constructs in accordance with embodiments of the disclosure.

Referring now to unary bSNN 1700 at FIG. 17, for input i, $n_o$ may spike at i+s‹$w^d$› for the following choice of parameters: θ=1.0; d=1; Δ=0.03; and the spike response function S‹$1.0^1$›=143 and s‹$3.0^1$›=27. Table 1800 at FIG. 18 illustrates some exemplary spike times for these parameters.

A filter f⟨c|d|th⟩ may be an instance of a unary bSNN. For example, and without limitation a filter may allow input c to trigger a spike on the output of the neuron. That is, for any other input the output neuron will not spike. Parameters of a filter may include a synaptic weight w=1.0, a delay d, and an output neuron having a threshold th. One way of defining a filter is using the following spike-response function:

$$\varepsilon(t) = \begin{cases} th & \text{if } t = c+d \\ 0 & \text{if } t \neq c+d \end{cases}$$

Thus, at t=c+d:

$$x(c+d)=w*\varepsilon(c+d)=1.0*th=th$$

and the output neuron of the filter fires a spike.

Figure 21A:
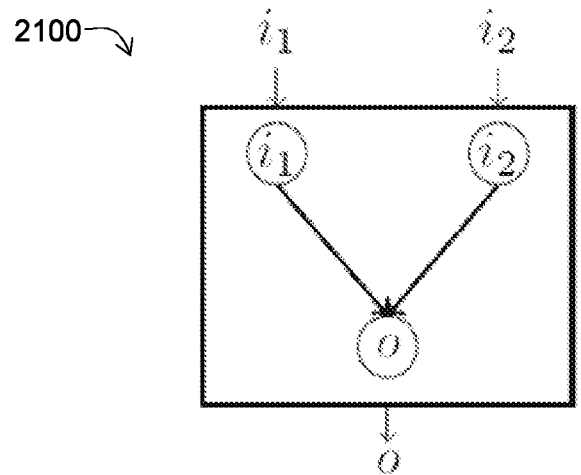
FIGS. 21A and 21B are a schematic diagram for exemplary neural network composition constructs in accordance with embodiments of the disclosure.
Figure 21B:
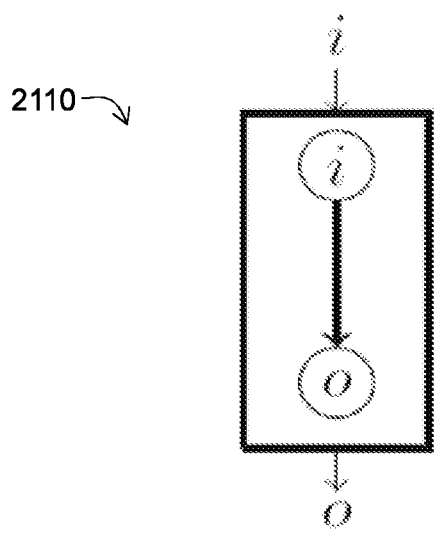
Figure 22:
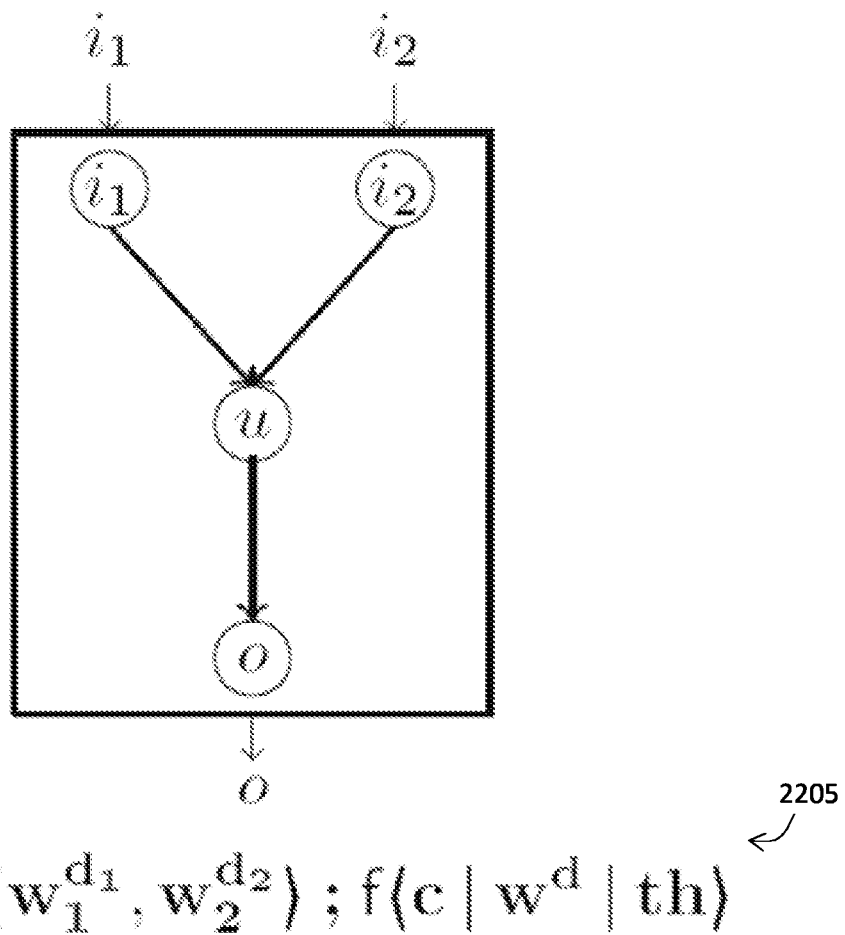
FIG. 22 is a schematic diagram for exemplary neural network composition constructs in accordance with embodiments of the disclosure.

Components may be employed with or without filters. Exemplary results of component bSNNs for XOR without filters is illustrated in table 1900 at FIG. 19. By contrast, results of a binary bSNN 2100 (see FIG. 21A) vertically composed with filter 2110 (see FIG. 21B) are illustrated in table 2000 at FIG. 20. Filter operation defined: if i=c there is output o; if i≠c, there is no output. FIG. 22 illustrates binary bSNN 2200 composed with filter (and associated mathematical representation 2205). Operation defined: if u=c there is output o; if u≠c, there is no output.

Figure 23:
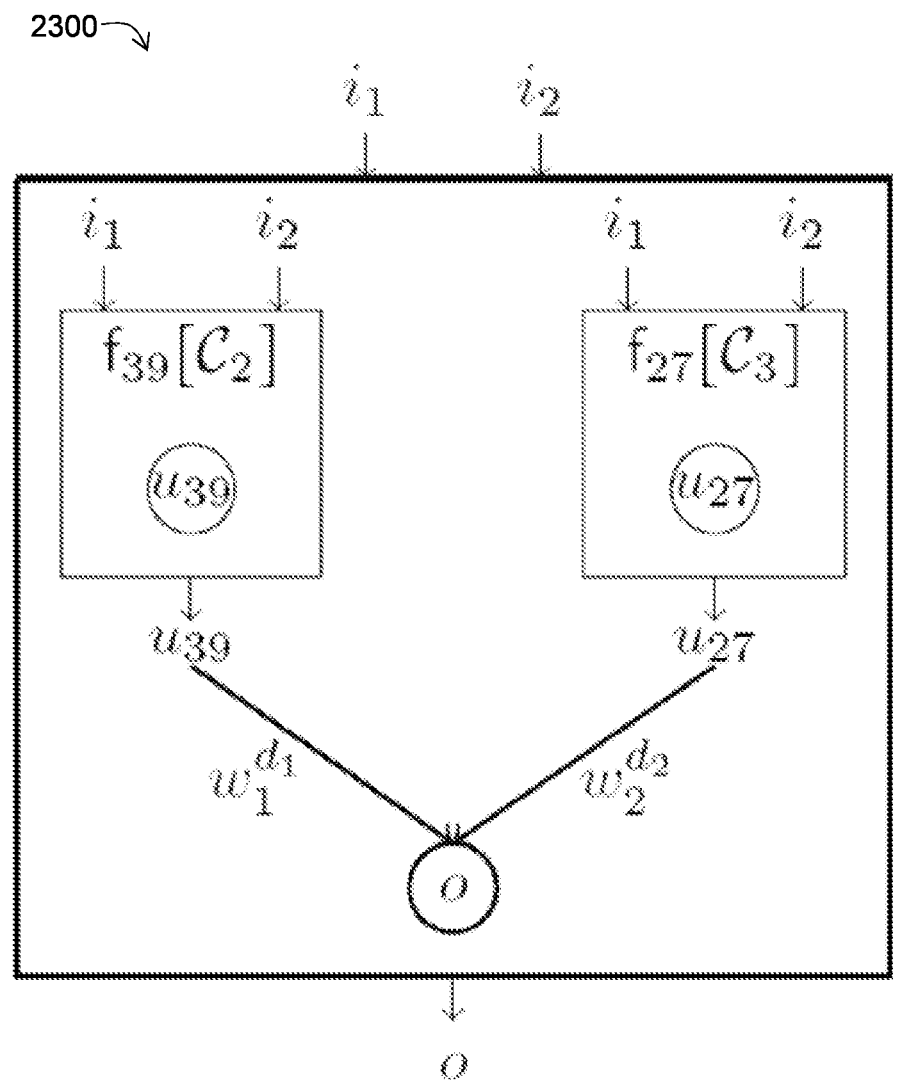
FIG. 23 is a schematic diagram for exemplary neural network composition constructs in accordance with embodiments of the disclosure.
Figure 24:
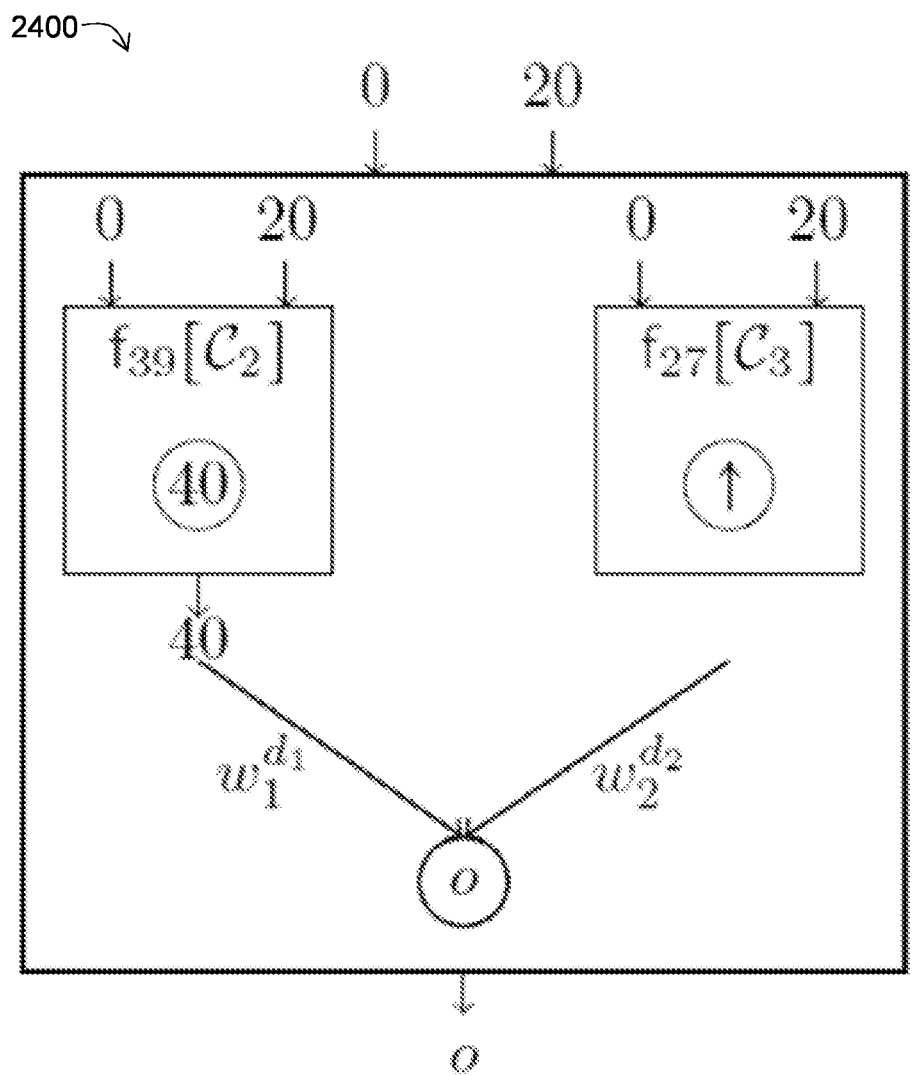
FIG. 24 is a schematic diagram for exemplary neural network composition constructs in accordance with embodiments of the disclosure.

Returning to an SNN that is constructed to compute XOR (from the method 1000 of FIG. 10), the remaining processes may be summarized as follows:

Compose $f_{39}[C_2]$ and $f_{27}[C_3]$ to compute $\oplus|_{\{(T, F), (F, T)\}}$:
$f_{39}[C_2]$: (0, 20)→40
computes $\oplus|_{\{(T, F)\}}$: {(T, F)}→T
$f_{27}[C_3]$: (20, 0)→28
computes $\oplus|_{\{(F, T)\}}$: {(F, T)}→T
Both components implement constant functions that evaluate to the same constant, T
This composition is denoted by:
$f_{39}[C_2]\|f_{27}[C_3]$
Compose $f_{35}[C_1]$ and $f_{36}[C_4]$ to compute $\oplus|_{\{(T, T), (F, F)\}}$:
$f_{35}[C_1]$: (0, 0)→36
computes $\oplus|_{\{(T, T)\}}$: {(T, T)}→F
$f_{36}[C_4]$: (20, 20)→37
computes $\oplus|_{\{(F, F)\}}$: {(F, F)}→F
Both components implement constant functions that evaluate to the same constant, F
This composition is denoted by
$f_{35}[C1]\|f_{36}[C_4]$
Compose the two resulting SNNs: $f_{39}[C_2]\|f_{27}[C_3]$ and $f_{35}[C1]\|f_{36}[C_4]$
Subsequent (same-constant) construction of $f_{39}[C_2]\|f_{27}[C_3]$, may be summarized as follows:
SNN $f_{39}[C_2]$ computes function $\oplus|_{\{(T, F)\}}$, which evaluates to T
For input (0, 20) it outputs 40
Thus, it represents T as an output by 40
For inputs (0, 0), (20, 0), (20, 20) it produces no output
SNN $f_{27}[C_3]$ computes function $\oplus|_{\{(F, T)\}}$, which evaluates to T
For input (20, 0) it outputs 28
Thus, it represents T as an output by 28
For inputs (0, 0), (0, 20), (20, 20) it produces no output.
The structure of the composition of these two components, which implements $\oplus|_{\{(T, F), (F, T)\}}$ is as follows (see graphic 2300 at FIG. 23):

The inputs this structure may accept are
(0, 20) to represent (T, F)
(20, 0) to represent (F, T)
A single value o may represent the output T
For inputs (0, 0) and (20, 20) it produces no output, since neither component produces an output.
Consider input (0, 20) (see component 2400 at FIG. 24)
Since only the first component fires a spike, the output spike time o satisfies the equation $$o=40+s[w^{d1}_1]$$

Figure 25:
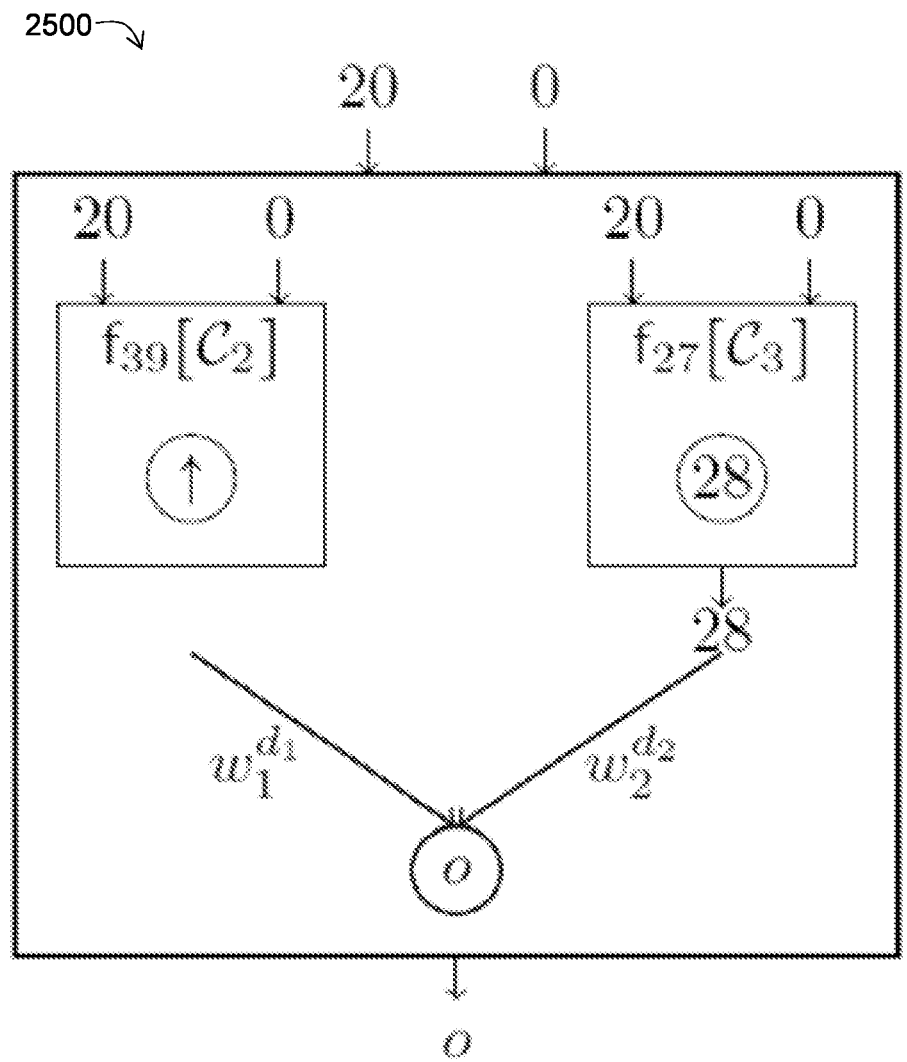
FIG. 25 is a schematic diagram for exemplary neural network composition constructs in accordance with embodiments of the disclosure.

Consider input (20, 0) (see component 2500 at FIG. 25)
Since only the second component fires a spike, the output spike time o satisfies the equation $$o=28+s[w^{d2}_2]$$

Output o may satisfy the two constraints above.

$$40+s[w_1^{d1}]=28+s[w_2^{d2}]$$

$$40-28=12=s[w_2^{d2}]-s[w_1^{d1}]$$

Two possible instantiations: (see the spike times for unary bSNNs described above)

$$12=47-35=(46+1)-35=(s[2.0^1]+1)-s[2.5^1]=s[2.0^2]=s[2.5^1] \qquad 1.$$

$w_1=2.5 \; d_1=1$
$w_2=2.0 \; d_2=2$
o=75
This composition of $f_{39}[C_2]$ and $f_{27}[C_3]$ is denoted by ⟨$2.5^1|f_{39}[C_2]\|f_{27}[C_3]|2.0^2$⟩

$$12=35-23=35-(20+3)=s[2.5^1]-(s[4.0^1]+3)=s[2.5^1]-s[4.0^4] \qquad 2.$$

$w_1=4.0 \; d_1=4$
$w_2=2.5 \; d_2=1$
o=63
This other composition of $f_{39}[C_2]$ and $f_{27}[C_3]$ with different parameters is denoted by ⟨$4.0^4 \mathcal{S} f_{39}[C_2]\|f_{27}[C_3] \mathcal{S} 2.5^1$⟩

For the ongoing example scenario, assume the second composition is chosen.

Figure 26:
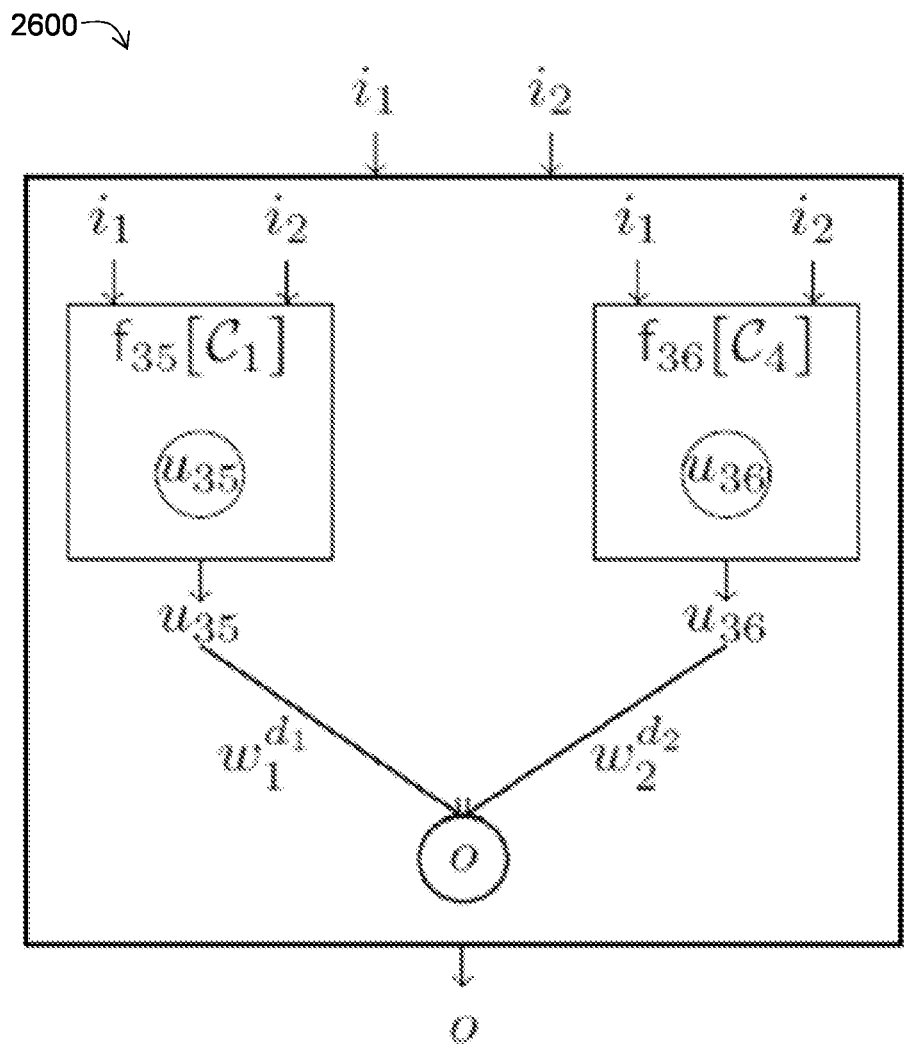
FIG. 26 is a schematic diagram for exemplary neural network composition constructs in accordance with embodiments of the disclosure.
Figure 27:
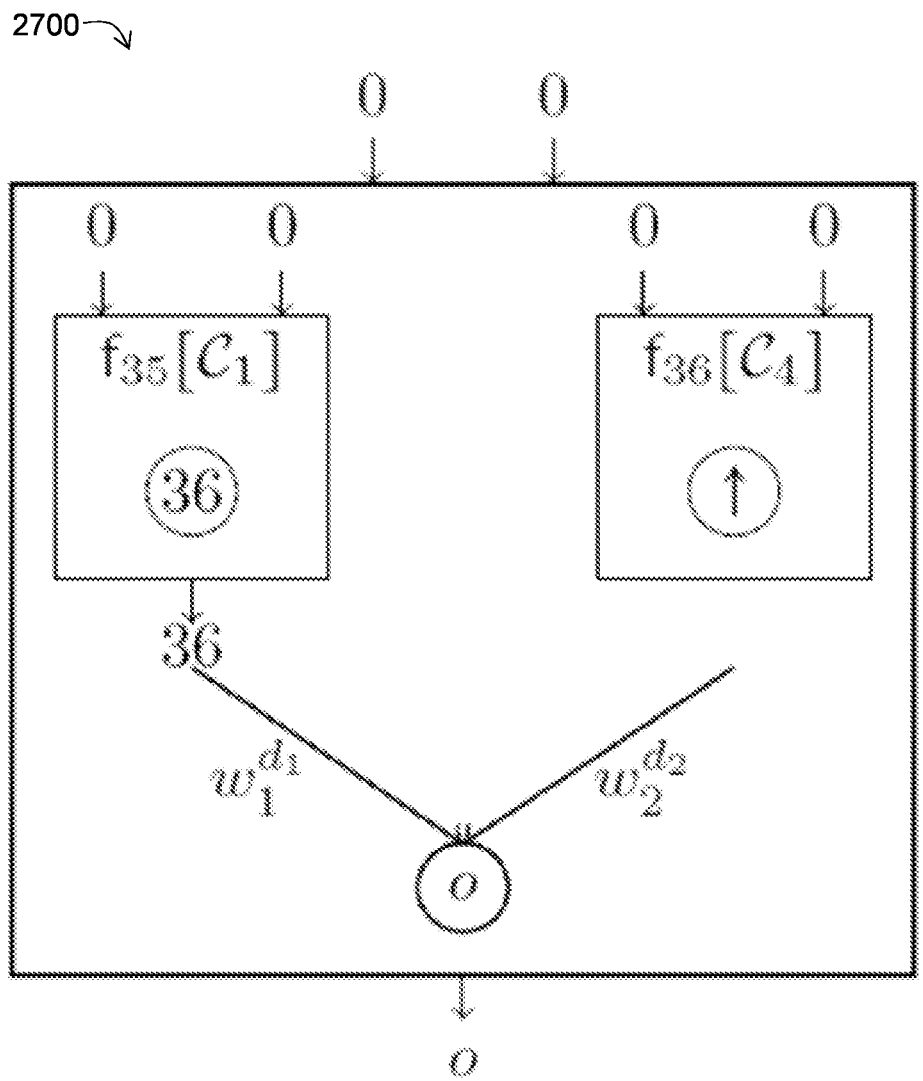
FIG. 27 is a schematic diagram for exemplary neural network composition constructs in accordance with embodiments of the disclosure.

Subsequent (same-constant) construction of $f_{35}[C_1]\|f_{36}[C_4]$ may be summarized as follows:
SNN $f_{35}[C_1]$ computes function $\oplus|_{\{(T, T)\}}$, which evaluates to F
For input (0, 0) it outputs 36
Thus, it represents F as an output by 36
For inputs (0, 20), (20, 0), (20, 20) it produces no output.
SNN $f_{36}[C_4]$ computes function $\oplus|_{\{(F, F)\}}$, which evaluates to F
For input (20, 20) it outputs 37
Thus, it represents F as an output by 37
For inputs (0, 0), (0, 20), (20, 0) it produces no output
The structure of the composition of these two components, which implements $\oplus|_{\{(T, T), (F, F)\}}$ is as shown in graphic 2600 at FIG. 26:
The inputs this structure may accept are—
(0, 0) to represent (T, T)—
(20, 20) to represent (F, F)
A single value o may represent the output F
For inputs (0, 20) and (20, 0) it produces no output, since neither component produces an output
Consider input (0, 0) (see component 2700 at FIG. 27)
Since only the first component fires a spike, the output spike time o satisfies the equation $$o=36+s[w^{d1}_1]$$

Figure 28:
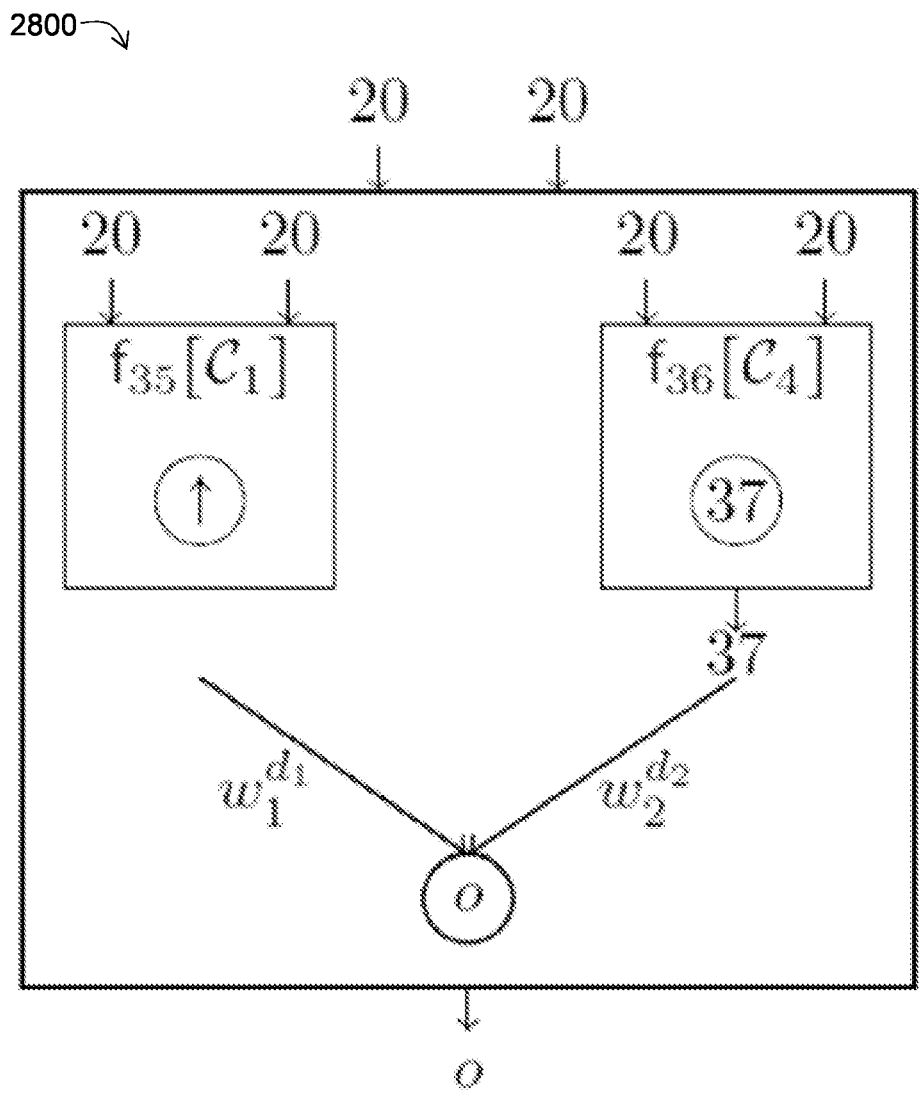
FIG. 28 is a schematic diagram for exemplary neural network composition constructs in accordance with embodiments of the disclosure.

Consider input (20, 20) (see component 2800 at FIG. 28)
Since only the second component fires a spike, the output spike time o satisfies the equation $$o=37+s[w_2^{d_2}]$$

Output o may satisfy the two constraints above.

$$36+s[w_1^{d_1}]=37+s[w_2^{d_2}]$$

$$37-36=1=s[w_1^{d_1}]-s[w_2^{d_2}]$$

One possible instantiation: (See the spike times for unary bSNNs as described above):

$$1=28-27=28-(24+3)=s[3.0^1]-(s[3.5^1]+3)=s[3.0^1]=s[3.5^1]$$

$w_1=3.0$ $d_1=1$
$w_2=3.5$ $d_2=2$
$o=64$

Construction of an SNN to compute $\oplus$, the XOR function, may be summarized as follows (more specifically, (composition of $\langle 4.0^4|f_{39}[C_2]||f_{27}[C_3]|2.5^1\rangle$ and $\langle 3.0^1|f_{35}[C_1]||f_{36}[C_4]|3.5^4\rangle$):

$\langle 4.0^4|f_{39}[C_2]||f_{27}[C_3]|2.5^1\rangle$ $\langle 4.0^4|f_{39}[C_2]||f_{27}[C_3]|2.5^1\rangle$
maps (0, 20) $\mapsto$ 63
(20, 0) $\mapsto$ 63
no output for (0, 0), (20, 20)
computes $\oplus|_{\{(T, F), (F, T)\}}$: {(T, F), (F, T)} $\mapsto$ T
Let $C_T=\langle 4.0^4|f_{39}[C_2]||f_{27}[C_3]|2.5^1\rangle$
SNN CT represents output T by 63

$\langle 3.0^1|f_{35}[C_1]||f_{36}[C_4]|3.5^4\rangle$ $\langle 3.0^1|f_{35}[C_1]||f_{36}[C_4]|3.5^4\rangle$
maps (0, 0) $\mapsto$ 64
(20, 20) $\mapsto$ 64
no output for (0, 20), (20, 0)
computes $\oplus|_{\{(T, T), (F, F)\}}$: {(T, T), (F, F)} $\mapsto$ F
Let $C_F=\langle 3.0^1|f_{35}[C_1]||f_{36}[C_4]|3.5^4\rangle$
SNN $C_F$ represents output F by 64

Each component may produce extraneous outputs when given inputs for which it was not designed Thus, before composition with another component, each component is composed with a filter resulting in $$f_{63}[C_T]=f_{63}[\langle 4.04|f39[C2]||f27[C3]|2.51\rangle]$$

$$f_{64}[C_F]=f_{64}[\langle 3.01|f35[C1]||f36[C4]|3.54\rangle]$$

Figures 29, 30:
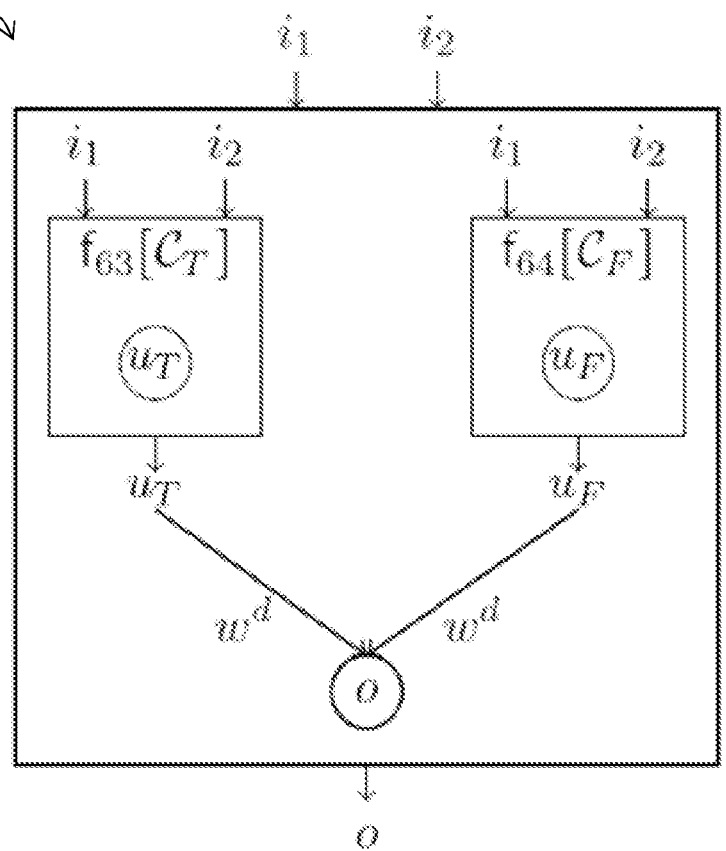
FIG. 29 is a table illustrating exemplary parameter values for neural network composition constructs according to embodiments of the disclosure.
FIG. 30 is a schematic diagram for exemplary neural network composition constructs in accordance with embodiments of the disclosure.

Table 2900 at FIG. 29 illustrates exemplary SNNs already constructed, such that $f_{63}[C_T]$ represents output T by 64, and $f_{64}[C_F]$ represents output T by 65.

Figure 32:
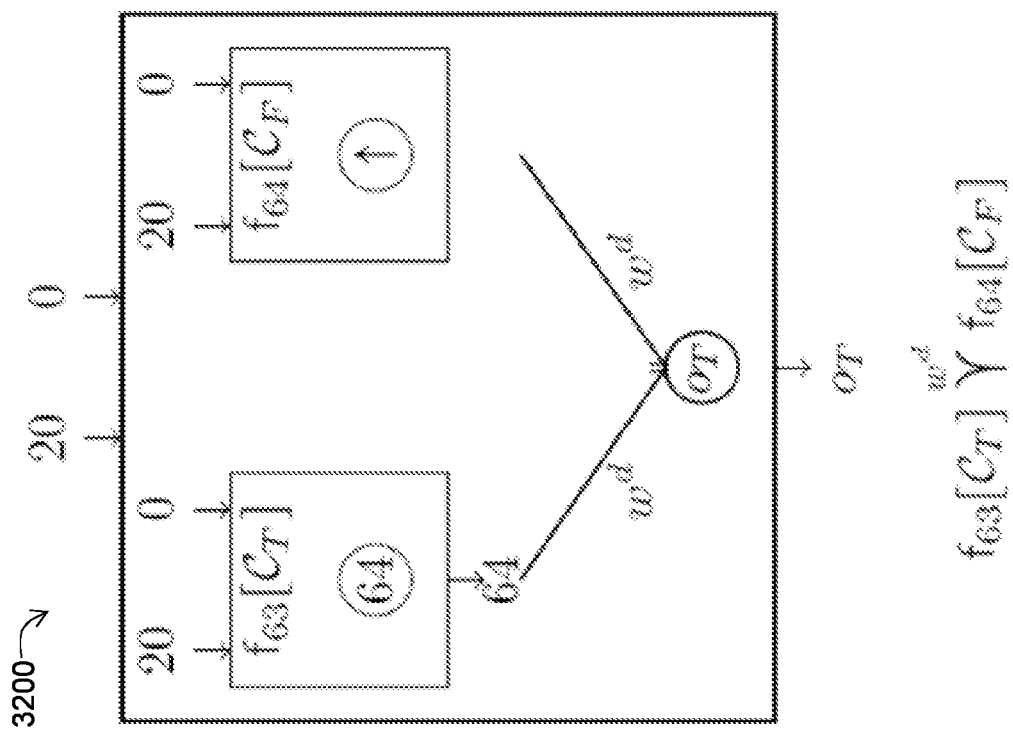
FIG. 32 is a schematic diagram for exemplary neural network composition constructs in accordance with embodiments of the disclosure.
Figure 31:
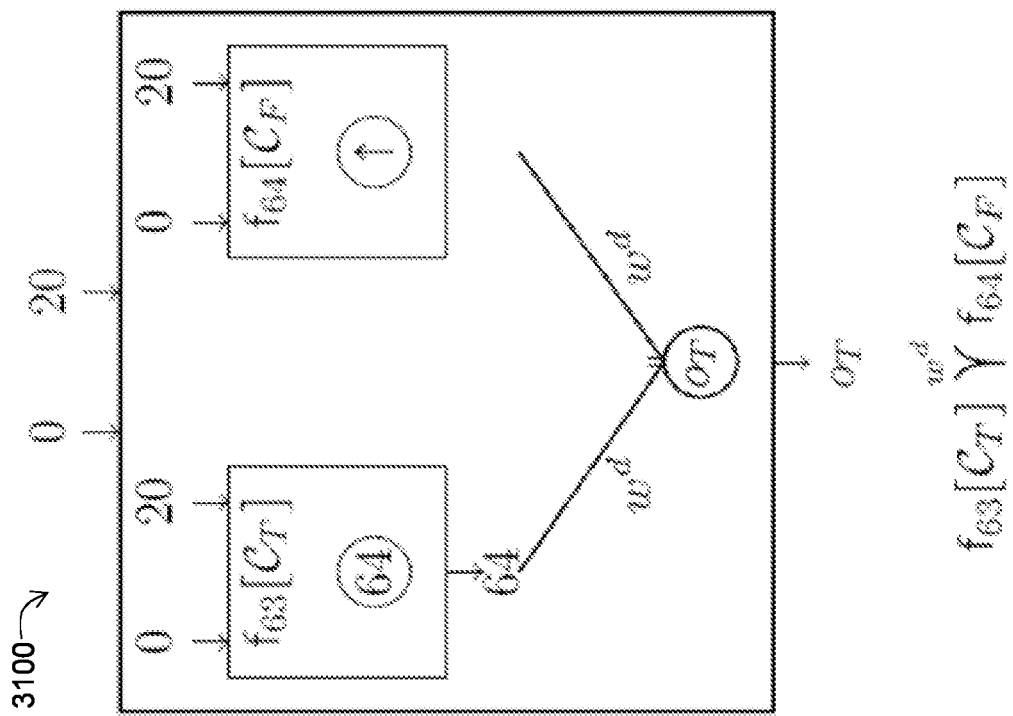
FIG. 31 is a schematic diagram for exemplary neural network composition constructs in accordance with embodiments of the disclosure.

Different-constant composition of $f_{63}[C_T]$ and $f_{64}[C_F]$ may be summarized as follows (see also component 3000 at FIG. 30):

These two components implement $\oplus|_{\{(T, F), (F, T)\}}$ and $\oplus|_{\{(T, T), (F, F)\}}$ Their composition implements $\oplus|_{\{(T, F), (F, T), (T, T), (F, F)\}}=\oplus$ The structure of their composition is as follows:

Consider inputs (0, 20) and (20, 0) (see components 3100, 3200 at FIG. 31 and FIG. 32, respectively)

Figure 34:
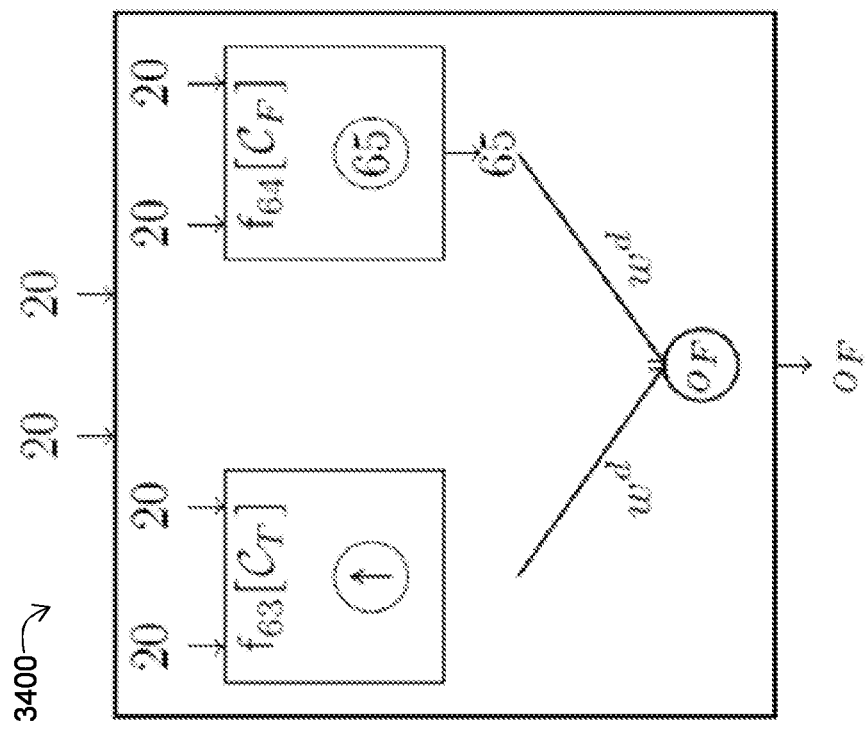
FIG. 34 is a schematic diagram for exemplary neural network composition constructs in accordance with embodiments of the disclosure.
Figure 33:
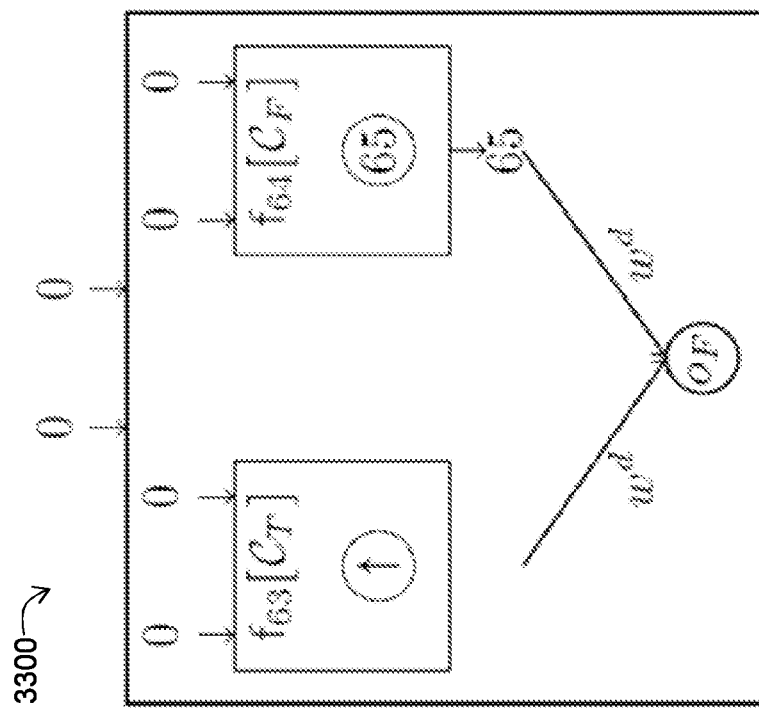
FIG. 33 is a schematic diagram for exemplary neural network composition constructs in accordance with embodiments of the disclosure.

Consider inputs (0, 0) and (20, 20) (see components 3300, 3400 at FIG. 33 and FIG. 34, respectively)

$$o_F=65+s[w^d]$$

Since T≠F, the values representing them are necessarily different.

Component $f_{63}[C_T]$ represents T as an output by 64, and component $f_{64}[C_F]$ represents F as an output by 65

Since 64≠65, then $o_T=64+s[w^d]\neq 65+s[w^d]=o_F$, and this composition has distinct representations for the two Boolean values Any choice of synaptic parameters w and d that produces a spike, that is for which $s[w^d]$ is defined, is acceptable.

For example, from the table above, arbitrarily chosen is $s[3.0^1]=28$ $$o_T=64+28=92$$

$$o_F=65+28=93$$

The resulting composition may be denoted by $$f_{63}[C_T] \overset{3.0^1}{Y} f_{64}[C_F]$$

It will be appreciated that the systems and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

DRAWING NUMBER KEY

100 Neural Network
102 Input to Neural Network
105 Output of Neural Network
110 Spiking Neural Network (SNN)/single synapse
112 Presynaptic neuron
115 Postsynaptic neuron
120 Spiking Neural Network (SNN)/multiple synapse
130 Sample spike times table
132 Unary basic SNN (bSNN)
134 Spike time of bSNN
142 Firing shift scenario: Basic
144 Firing shift scenario: Input delay
146 Firing shift scenario: Synapse delay increase
148 Firing shift scenario: Vertical composition of bSNNs
152 Table of bSNN (3.5, 4.5) for $n_1=0$
154 Table of bSNN (3.5, 4.5) for $n_2=0$
162 XOR definition 164 Constant functions that compute XOR
172 Constant function implemented as bSNN (1.0, 1.5)
174 Constant function implemented as bSNN (2.0, 2.5)
176 Constant function implemented as bSNN (1.5, 3.5)
178 Constant function implemented as bSNN (1.5, 3.5)
200 Neural Network Design System (NNDS)
202 Computing device
210 Wide network
212 Processor
213 Data Store
219 Network Interface
220 Modeling Subsystem
230 User Interface
300 Single-valued relation representation: $f: A \to B$
400 Finite function representation: $f_T: I_T \to O$
500 Same-constant composition representation
600 Different-constant composition representation
702 Designated output of $C_1$
704 Interfering output of $C_2$
706 Interfering output of $C_1$
708 Designated output of $C_2$
800 Same-constant composition construct
802 partial SNN $C_1^*$
805 partial SNN $C_2^*$
900 Different-constant composition construct
910 Different-constant composition with added unary bSNN
1000 Neural Network Compositional Construction method
1001 Method start
1002 Partition training input
1004 Determine representation for partition
1006 Obtain restrictions for partitions
1008 Construct subfunctions (SNN $\mathcal{N}_k$)
1010 Combine subfunctions into modeled function of interest
1099 Method end
1100 Sample Binary bSNN
1200 Binary bSNN computing function $\oplus|\{(T, T)\}$
1300 Binary bSNN computing function $\oplus|\{(T, F)\}$
1400 Binary bSNN computing function $\oplus|\{(F, T)\}$
1500 Binary bSNN computing function $\oplus|\{(F, F)\}$
1600 Sample Unary bSNN
1700 Unary bSNN spiking at $i+s\langle w^d \rangle$
1800 Sample spike times table for $\theta=1.0$; $d=1$; $\Delta=0.03$
1900 Sample spike times table for XOR without filters
2000 Sample spike times table for XOR with filter
2100 Binary bSNN
2110 Filter
2200 Binary bSNN with filter
2205 Mathematical representation for binary bSNN with filter
2300 Composition implementing $\oplus|_{\{(T, F), (F, T)\}}$
2400 Composition implementing $\oplus|_{\{(T, F), (F, T)\}}$ for input (0,20)
2500 Composition implementing $\oplus|_{\{(T, F), (F, T)\}}$ for input (20,0)
2600 Composition implementing $\oplus|_{\{(T, T), (F, F)\}}$
2700 Composition implementing $\oplus|_{\{(T, T), (F, F)\}}$ for input (0,0)
2800 Composition implementing $\oplus|_{\{(T, T), (F, F)\}}$ for input (20,20)
2900 Sample output of constructed SNNs
3000 Composition implementing $\oplus|_{\{(T, F), (F, T), (T, T), (F, F)\}} = \oplus$
3100 Composition implementing $\oplus$ for input (0,20)
3200 Composition implementing $\oplus$ for input (20,0)
3300 Composition implementing $\oplus$ for input (0,0)
3400 Composition implementing $\oplus$ for input (20,20)

What is claimed is:

1. A method of neural network (NN) construction comprising:
   receiving a construction training set of an output variable type and characterized by a construction domain, wherein said training set comprises
   an n×N array of inputs i;
   an m×N array of target outputs to be learned o; and
   an m×N array of actual outputs u containing error E
   represented by the following neural network input/output mappings:

$(i_{1_{(1)}}, \ldots, i_{n_{(1)}}) \mapsto (o_{1_{(1)}}, \ldots, o_{m_{(1)}})$ $(i_{1_{(2)}}, \ldots, i_{n_{(2)}}) \mapsto (o_{1_{(2)}}, \ldots, o_{m_{(2)}})$ $\vdots \mapsto \vdots$ $(i_{1_{(N)}}, \ldots, i_{n_{(N)}}) \mapsto (o_{1_{(N)}}, \ldots, o_{m_{(N)}})$;

and $(i_{1_{(1)}}, \ldots, i_{n_{(1)}}) \mapsto (u_{1_{(1)}}, \ldots, u_{m_{(1)}})$ $(i_{1_{(2)}}, \ldots, i_{n_{(2)}}) \mapsto (u_{1_{(2)}}, \ldots, u_{m_{(2)}})$ $\vdots \mapsto \vdots$ $(i_{1_{(N)}}, \ldots, i_{n_{(N)}}) \mapsto (u_{1_{(N)}}, \ldots, u_{m_{(N)}})$;

wherein said error E, which comprises a discrepancy between said target outputs o and said actual outputs u, is determined by $$E = \frac{1}{2}\sum_{k=1}^{m} (u_k - o_k)^2;$$

partitioning the construction training set to define a plurality of partition training sets of an output value type and each characterized by a respective partition domain, where a union of the respective partition domains of the partition training sets defines the construction domain of the construction training set;
   creating for each of the plurality of partition training sets a respective component neural network;
   correcting said error E by backpropagation comprising modifying component neural network parameters from output neurons backwards through a component neural network to input neurons; and
   combining the plurality of component neural networks to define a constructed neural network characterized by an instance of the construction training set, where the instance is of an output value type.

2. The method according to claim 1, where each of the plurality of component neural networks is of a single-valued type.

3. The method according to claim 1, where each of the plurality of partition domains further comprises a respective designated input domain such that the plurality of designated input domains is disjoint.

4. The method according to claim 1, where each of the plurality of component neural networks further comprises:
   a first input artificial neuron CJ;
   a second input artificial neuron C2;
   and
   an output artificial neuron.

5. The method according to claim 4, where at least one of the first input artificial neuron C1, the second input artificial neuron C2, and the output artificial neuron comprise at least one of a membrane potential, a threshold, and a spike time.

6. The method according to claim 4, further comprising:
a first artificial synapse connecting the first input artificial neuron C1 and the output artificial neuron; and
a second artificial synapse connecting the second input artificial neuron C2 and the output artificial neuron.

7. The method according to claim 6, where at least one of the first synapse and the second synapse comprise at least one of a weight and a delay.

8. The method according to claim 1, further comprising:
determining a respective representation for each of the plurality of partition training sets; and
determining a respective restriction for each of the plurality of representations; and
where creating the plurality of component neural networks further comprises constructing for each of the plurality of restrictions a first input artificial neuron C1, a second input artificial neuron C2, and an output artificial neuron.

9. A neural network (NN) model construction system utilizing a computer processor and a non-transitory computer-readable storage medium comprising a plurality of instructions which, when executed by the computer processor, is configured to:
receive a construction training set of an output variable type and characterized by a construction domain, wherein said training set comprises
an n×N array of inputs i;
an m×N array of target outputs to be learned o; and
an m×N array of actual outputs u containing error E
represented by the following neural network input/output mappings:

$(i_{1_{(1)}}, \ldots, i_{n_{(1)}}) \mapsto (o_{1_{(1)}}, \ldots, o_{m_{(1)}})$ $(i_{1_{(2)}}, \ldots, i_{n_{(2)}}) \mapsto (o_{1_{(2)}}, \ldots, o_{m_{(2)}})$ $\vdots \mapsto \vdots$ $(i_{1_{(N)}}, \ldots, i_{n_{(N)}}) \mapsto (o_{1_{(N)}}, \ldots, o_{m_{(N)}});$ and $(i_{1_{(1)}}, \ldots, i_{n_{(1)}}) \mapsto (u_{1_{(1)}}, \ldots, u_{m_{(1)}})$ $(i_{1_{(2)}}, \ldots, i_{n_{(2)}}) \mapsto (u_{1_{(2)}}, \ldots, u_{m_{(2)}})$ $\vdots \mapsto \vdots$ $(i_{1_{(N)}}, \ldots, i_{n_{(N)}}) \mapsto (u_{1_{(N)}}, \ldots, u_{m_{(N)}});$ wherein said error E, which comprises a discrepancy between said target outputs o and said actual outputs u, is determined by $$E = \frac{1}{2}\sum_{k=1}^{m}(u_k - o_k)^2;$$

partition the construction training set to define a plurality of partition training sets of an output value type and each characterized by a respective partition domain, where a union of the respective partition domains of the partition training sets defines the construction domain of the construction training set;
create for each of the plurality of partition training sets a respective component neural network;
correct said error E by backpropagation comprising modifying component neural network parameters from output neurons backwards through a component neural network to input neurons; and
combine the plurality of component neural networks to define a constructed neural network characterized by an instance of the construction training set, where the instance is of an output value type.

10. The system according to claim 9, where each of the plurality of component neural networks is of a single-valued type.

11. The system according to claim 9, where each of the plurality of partition domains further comprises a respective designated input domain such that the plurality of designated input domains is disjoint.

12. The system according to claim 9, where each of the plurality of component neural networks further comprises:
a first input artificial neuron CJ;
a second input artificial neuron C2;
and
an output artificial neuron.

13. The system according to claim 12, where at least one of the first input artificial neuron C1, the second input artificial neuron C2, and the output artificial neuron comprise at least one of a membrane potential, a threshold, and a spike time.

14. The system according to claim 12, further comprising:
a first artificial synapse connecting the first input artificial neuron C1 and the output artificial neuron; and
a second artificial synapse connecting the second input artificial neuron C2 and the output artificial neuron.

15. The system according to claim 14, where at least one of the first synapse and the second synapse comprise at least one of a weight and a delay.

16. The system according to claim 9, where the plurality of instructions which, when executed by the computer processor, is further configured to:
determine a respective representation for each of the plurality of partition training sets;
determine a respective restriction for each of the plurality of representations; and
construct for each of the plurality of restrictions a first input artificial neuron C1, a second input artificial neuron C2, and an output artificial neuron.

17. A computer-implemented method of neural network (NN) model construction comprising:
accessing a construction training set of an output variable type and characterized by a construction domain, wherein said training set comprises
an n×N array of inputs i;
an m×N array of target outputs to be learned o; and
an m×N array of actual outputs u containing error E
represented by the following neural network input/output mappings:

$(i_{1_{(1)}}, \ldots, i_{n_{(1)}}) \mapsto (o_{1_{(1)}}, \ldots, o_{m_{(1)}})$ $(i_{1_{(2)}}, \ldots, i_{n_{(2)}}) \mapsto (o_{1_{(2)}}, \ldots, o_{m_{(2)}})$ $\vdots \mapsto \vdots$ $(i_{1_{(N)}}, \ldots, i_{n_{(N)}}) \mapsto (o_{1_{(N)}}, \ldots, o_{m_{(N)}});$ and $(i_{1_{(1)}}, \ldots, i_{n_{(1)}}) \mapsto (u_{1_{(1)}}, \ldots, u_{m_{(1)}})$ $(i_{1_{(2)}}, \ldots, i_{n_{(2)}}) \mapsto (u_{1_{(2)}}, \ldots, u_{m_{(2)}})$ $\vdots \mapsto \vdots$ $(i_{1_{(N)}}, \ldots, i_{n_{(N)}}) \mapsto (u_{1_{(N)}}, \ldots, u_{m_{(N)}});$ wherein said error E, which comprises a discrepancy between said target outputs o and said actual outputs u, is determined by $$E = \frac{1}{2}\sum_{k=1}^{m}(u_k - o_k)^2;$$

partitioning the construction training set to define a plurality of partition training sets of an output value type and each characterized by a respective partition domain, where a union of the respective partition domains of the partition training sets defines the construction domain of the construction training set;

creating for each of the plurality of partition training sets a respective component neural network;

correcting said error E by backpropagation comprising modifying component neural network parameters from output neurons backwards through a component neural network to input neurons; and combining the plurality of component neural networks to define a constructed neural network characterized by an instance of the construction training set, where the instance is of an output value type.

18. The computer-implemented method according to claim 17, where creating each of the plurality of component neural networks further comprises:
creating a first input artificial neuron CJ;
creating a second input artificial neuron C2; and
creating an output artificial neuron.

19. The computer-implemented method according to claim 18, where creating each of the plurality of component neural networks further comprises creating at least one of the first input artificial neuron C1, the second input artificial neuron C2, and the output artificial neuron to comprise at least one of a membrane potential, a threshold, and a spike time.

20. The computer-implemented method according to claim 18, where creating each of the plurality of component neural networks further comprises:
creating a first artificial synapse connecting the first input artificial neuron C1 and the output artificial neuron; and
creating a second artificial synapse connecting the second input artificial neuron C2 and the output artificial neuron.

* * * * *